US00RE40223E

(19) United States
(12) Reissued Patent
Koike et al.

(10) Patent Number: US RE40,223 E
(45) Date of Reissued Patent: Apr. 8, 2008

(54) METHOD FOR CHARGING SECONDARY BATTERY

(75) Inventors: Kiichi Koike, Kanagawa-ken (JP); Harumi Murochi, Aichi-ken (JP); Masahito Ishiwata, Aichi-ken (JP); Hiroyuki Jimbo, Aichi-ken (JP); Norio Saito, Hyogo-ken (JP)

(73) Assignee: Matsushita Electric Industrial Co., Ltd., Osaka (JP)

(21) Appl. No.: 10/640,518
(22) Filed: Aug. 12, 2003

Related U.S. Patent Documents

Reissue of:
(64) Patent No.: 6,275,006
Issued: Aug. 14, 2001
Appl. No.: 09/318,876
Filed: May 26, 1999

(30) Foreign Application Priority Data

May 27, 1998 (JP) ..... 10-145348
Jun. 4, 1998 (JP) ..... 10-155530
Feb. 19, 1999 (JP) ..... 11-041199
Mar. 24, 1999 (JP) ..... 11-079108

(51) Int. Cl.
*H02J 7/00* (2006.01)

(52) U.S. Cl. ..... 320/125
(58) Field of Classification Search ..... 320/125, 320/124, 134, 160, 162, 152
See application file for complete search history.

(56) References Cited

U.S. PATENT DOCUMENTS 3,929,505 A 12/1975 Burnett et al. ..... 205/63
4,433,294 A * 2/1984 Windebank ..... 320/162
4,937,528 A * 6/1990 Palanisamy ..... 320/132

(Continued)

FOREIGN PATENT DOCUMENTS

| | | | |
|---|---|---|---|
| CA | 2208653 | | 12/1997 |
| EP | 0 351 941 A2 | | 1/1990 |
| FR | 2644936 | | 9/1990 |
| FR | 2730358 | | 8/1996 |
| GB | 2 080 642 A | | 2/1982 |
| JP | 01311834 | | 12/1989 |
| JP | 06078471 | | 3/1994 |
| JP | 7-78637 | * | 3/1995 |
| JP | 07288936 | | 10/1995 |
| JP | 8-22842 | * | 1/1996 |
| JP | 8-22844 | * | 1/1996 |
| JP | 8-37030 | * | 2/1996 |
| JP | 08180907 | | 7/1996 |
| JP | 08329988 | | 12/1996 |
| JP | 8-329988 | * | 12/1996 |
| JP | 08329989 | | 12/1996 |
| JP | 09093826 | | 4/1997 |
| JP | 09163624 | | 6/1997 |
| JP | 10-010212 | | 1/1998 |
| JP | 10108383 | | 4/1998 |
| JP | 10189057 | | 7/1998 |
| JP | 10-241746 | * | 9/1998 |

OTHER PUBLICATIONS

European Search Report dated Mar. 23, 2004.
Chinese Office Action dated Aug. 6, 2004.

*Primary Examiner*—Edward H Tso
(74) *Attorney, Agent, or Firm*—Snell & Wilmer L.L.P.

(57) ABSTRACT

A method for charging a secondary battery by measuring the static/open circuit voltage and comparing it to a predetermined value includes: a first step of precharging the secondary battery; thereafter pausing a predetermined interval; a step of measuring a secondary battery voltage Vba1 after performing the pausing; and a step of charging the secondary battery based on the measurement of the secondary battery voltage Vba1.

1 Claim, 21 Drawing Sheets

U.S. PATENT DOCUMENTS 5,219,676 A 6/1993 Bullock et al. ..... 429/48
5,237,259 A * 8/1993 Sanpei ..... 320/158
5,543,702 A * 8/1996 Pfeiffer ..... 320/125
5,596,259 A 1/1997 Mino et al. ..... 230/157
5,617,007 A * 4/1997 Keidl et al. ..... 320/141
5,654,622 A * 8/1997 Toya et al. ..... 320/134
5,663,629 A * 9/1997 Hinohara ..... 320/158
5,696,436 A * 12/1997 Kim et al. ..... 320/160
5,703,466 A * 12/1997 Honda et al. ..... 320/152
5,726,555 A * 3/1998 Takamoro ..... 320/157
5,742,148 A * 4/1998 Sudo et al. ..... 320/134
5,744,937 A * 4/1998 Cheon ..... 320/125
5,777,457 A * 7/1998 Lee ..... 320/137
5,815,389 A * 9/1998 Plow et al. ..... 320/134
5,841,265 A * 11/1998 Sodo et al. ..... 320/134
5,853,908 A * 12/1998 Okutoh ..... 320/150
5,861,733 A * 1/1999 Yoshikawa ..... 320/164
5,864,220 A * 1/1999 Reipur et al. ..... 320/134
5,869,949 A * 2/1999 Nishikawa et al. ..... 320/125
5,905,362 A * 5/1999 Nagano et al. ..... 320/125
5,945,805 A * 8/1999 Takei et al. ..... 320/124
5,986,437 A * 11/1999 Lee ..... 320/162
5,994,874 A * 11/1999 Hirose ..... 320/125
5,994,875 A * 11/1999 Lee ..... 320/132
6,060,185 A * 5/2000 Okutoh ..... 320/134

* cited by examiner

T4≦Tc Shallow discharge
T4>Tc Deep discharge
Discharge depth reference time
Tc
V1
V2
V4
T2
T3
T4
Charge voltage
Charge current
Charge voltage (V)
Charge current (A)
Charge time (h)
Initial charge current (Is)
15
14
13
12
5
4
3
2
1
0
3
6
9
12

PRIOR ART

PRIOR ART

PRIOR ART

METHOD FOR CHARGING SECONDARY BATTERY

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method for charging a secondary battery.

2. Description of the Related Art

Methods for charging a secondary battery can be generally classified into constant-voltage methods and constant-current methods. The constant-current method is capable of rapid charging but is likely to result in overcharging. The constant-voltage method generally controls the charge voltage at a level which is equal to or less than a voltage which causes hydrogen gas generation within the secondary battery. As a result, the charge current decreases as the charging process proceeds, thereby minimizing overcharging.

Thus, the constant-voltage method minimizes overcharging but may result in undercharging. Therefore, methods have been used which combine both the constant-voltage method and the constant-current method.

In the case of combining both the constant-voltage method and the constant-current method, the control voltage, current, and charge time are prescribed so that the proper charge electricity amount equals about 105% to about 120% of the discharged electricity amount.

In recent years, lead-based secondary batteries have replaced conventional liquid-type lead secondary batteries as power sources for various cycle services such as electric automobiles. In particular, lead secondary batteries of a sealed type, which absorb gaseous oxygen generated within the batteries at the negative plates by employing a limited amount of electrolytic solution, have been in use.

Sealed-type lead secondary batteries for cycle services may be subjected to various loads depending on the specific device for which they are used, and various usage time and/or frequency depending on the user. Therefore, the degree of discharge or "discharge depth" which is experienced by sealed-type lead secondary batteries may vary from battery to battery.

It has been discovered that, in the case of aforementioned sealed-type lead secondary batteries for cycle services, merely prescribing a certain charge electricity amount relative to the discharged electricity amount does not allow the sealed-type lead secondary batteries to exhibit desired longevity characteristics.

For example, it to conceivable that a sealed-type lead secondary battery which has not been well-discharged (i.e., "shallowly discharged") may be charged by using a charger which is intended for a well-discharged (i.e., "deeply discharged") sealed-type lead secondary battery. Such a charger has a relatively high charge voltage. In such cases, the lifetime of the sealed-type lead secondary battery may be drastically shortened even is a ratio of discharged electricity amount to charge electricity amount within a conventionally acceptable range is prescribed. The problem of such shortened lifetimes becomes especially conspicuous with sealed-type lead secondary batteries employing a Pb—Ca—Sn type alloy (not containing any Sb) as a positive grid alloy and employing a limited amount of electrolytic solution.

Moreover, the above-mentioned problem may unpredictably occur or may not occur at all, depending on the manner in which a given device associated with such a sealed-type lead secondary battery is used by a user. It is practically impossible to select different types of chargers depending on the manner in which a device associated with such a sealed-type lead secondary battery in used by a user.

SUMMARY OF THE INVENTION

A method for charging a secondary battery according to the present invention includes: a first step of precharging the secondary battery; a second step of measuring a first secondary battery voltage Vba1 after performing the precharging; and a third step of charging the secondary battery based on the measurement of the first secondary battery voltage Vba1.

In one embodiment of the invention, the first step includes a fourth step of measuring a second secondary battery voltage Vba0 prior to the charging of the secondary battery, and the third step includes: a fifth step of comparing the first secondary battery voltage Vba1 against a first prescribed voltage V1, a second prescribed voltage V2, and a third prescribed voltage V3, where V3<V2<V1; a sixth step of performing a first charging in a first charge mode if the first secondary battery voltage Vba1 is between and including the first prescribed voltage V1 and the second prescribed voltage V2; a seventh step of performing a second charging in a second charge mode if the first secondary battery voltage Vba1 is between and including the second prescribed voltage V2 and the third prescribed voltage V3; and an eighth step of performing an active charging if the first secondary battery voltage Vba1 is lower than the third prescribed voltage V3.

In another embodiment of the invention, the eighth step includes: a ninth step of repeating a cycle including the active charging and an ensuing measurement of a third secondary battery voltage Vba2, within a predetermined cycle limit, until the third secondary battery voltage Vba2 becomes higher than the third prescribed voltage V3, and performing a second charging in the second charge mode if the third secondary battery voltage Vba2 becomes higher than the third prescribed voltage V3 within the predetermined cycle limit; and a tenth step of terminating the charging for the secondary battery if the third secondary battery voltage Vba2 has not become higher than the third prescribed voltage V3 within the predetermined cycle limit.

In still another embodiment of the invention, the sixth step includes: a step of subjecting the secondary battery to a constant-voltage charge using a first charge voltage Vch1 and a step of subjecting the secondary battery to a constant-voltage charge using a second charge voltage Vch2 after a charge current has decreased to a predetermined value Ia, where Vch2<Vch1. The seventh step includes: a step of subjecting the secondary battery to a constant-voltage charge using a third charge voltage Vch3; an eleventh stop of subjecting the secondary battery to a constant-current charge using a predetermined charge current Ic after the charge current has decreased to a predetermined value Ib, and a step of subjecting the secondary battery to a constant-voltage charge using a charge voltage Vch4 after the eleventh stop, where Vch4<Vch3.

In still another embodiment of the invention, the method further includes: a step of terminating the charging for the secondary battery if the first secondary battery voltage Vba1 measured after performing the precharging is higher than the first prescribed voltage V1 or if the first secondary battery voltage Vba1 is lower than a fourth prescribed voltage V4, where V4<V3.

In still another embodiment of the invention, the first stop includes: a step performed in a case where the second secondary battery voltage Vba0 is equal to or greater than a fifth prescribed voltage V5, the stop including: measuring the first secondary battery voltage Vba1 after the precharging is measured if a charge current Ip during the precharging to equal to or smaller than Imax and equal to or greater than Imin (where Imin>0): displaying a warning message to indicate abnormal operation of a charging device and terminating the charging if the charge current Ip is greater than Imax; or displaying a warning message to indicate abnormality of the secondary battery and terminating the charging if the charge current Ip during the precharging is smaller than Imin; and a step performed in a case where the second secondary battery voltage Vba0 is lower than the fifth prescribed voltage V5, the step including: displaying a warning message to indicate abnormal operation of the charging device and terminating the charging if the charge current Ip to greater than Imax; and measuring the first secondary battery voltage Vba1 after the precharging if the charge current Ip during the precharging is equal to or smaller than Imax.

In still another embodiment of the invention, the first step includes a step of measuring an ambient temperature Ta prior to the charging of the secondary battery, and the first charge voltage Vch1, the second charge voltage Vch2, the third charge voltage Vch3, and the fourth charge voltage Vch4 have negative characteristics with respect to the ambient temperature Ta.

In another aspect of the invention, there is provided a method for charging a lead secondary battery including a positive grid of Pb—Ca alloy and an electrolytic solution including a diluted sulfuric acid having a specific gravity equal to or greater than about 1.280 at about 20° C., the method including: controlling a charge voltage so as to be about 2.40 V/cell or less where a discharge depth of the lead secondary battery is about 50% or less of a rated capacity of the lead secondary battery.

In one embodiment of the invention, a battery value immediately after the charging is begun is used as a parameter indicating the discharge depth.

In another embodiment of the invention, a charge time which elapses from the beginning of charging until attaining a predetermined battery value is used as a parameter indicating the discharge depth.

In still another embodiment of the invention, the charge voltage is controlled so as to maintain negative characteristics with respect to an ambient temperature at which the charging is performed.

In still another embodiment of the invention, the lead secondary battery includes a sealed-type lead secondary battery which absorbs an oxygen gas at a negative plate of the sealed-type lead secondary battery, the oxygen gas being generated from a positive plate of the sealed-type lead secondary battery.

In yet another aspect of the invention, there is provided a method for charging a secondary battery by controlling a charge voltage so as to be equal to or lower than a predetermined control voltage value, wherein the control voltage value is controlled so as to maintain negative characteristics with respect to an ambient temperature at which the charging is performed, and to maintain positive characteristics with respect to a discharge depth of the secondary battery.

In one embodiment of the invention, a parameter indicating the discharge depth is selected from a charge voltage value at the beginning of charging and a time which elapses from the beginning of charging until the charge voltage increases to a predetermined voltage.

In yet another aspect of the invention, there is provided a charging device for charging a secondary battery including: a charge voltage control section for controlling a charge voltage so as to be equal to or lower than a predetermined control voltage value, an ambient temperature measurement section for measuring an ambient temperature during the charging; and a discharge depth detection section for detecting a discharge depth of the secondary battery wherein the charge voltage control section controls the control voltage value so as to maintain negative characteristics with respect to the ambient temperature measured by the ambient temperature measurement section, and to maintain positive characteristics with respect to the discharge depth measured by the discharge depth detection section.

In one embodiment of the invention, the discharge depth detection section includes means for measuring a parameter selected from a charge voltage value at the beginning of charging and a time which elapses from the beginning of charging until the charge voltage increases to a predetermined voltage, and the discharge depth detection section detects the discharge depth by using the measured parameter.

In yet another aspect of the invention, there is provided a method for charging a lead secondary battery including: a first step of detecting a discharge state of the lead secondary battery; and a second step of subjecting the lead secondary battery to a constant-voltage charging if the detected discharge state is shallow as compared to a predetermined discharge state, and subjecting the lead secondary battery to a constant-current charging if the detected discharge state is deep as compared to the predetermined discharge state.

In one embodiment of the invention, the second step includes detecting the discharge state based on a parameter which is selected from a charge voltage value at the beginning of charging and a time which elapses from the beginning of charging until attaining a predetermined charge voltage.

Thus, the invention described herein makes possible the advantage of providing a charger (charging device) for cycle services which is capable of preventing the problem of shortened lifetimes which is typical of sealed-type lead secondary batteries, independent of how a device associated with a sealed-type lead secondary battery is used by a user.

This and other advantages of the present invention will become apparent to those skilled in the art upon reading and understanding the following detailed description with reference to the accompanying figures.

DESCRIPTION OF THE PREFERRED EMBODIMENTS

First Embodiment of the Invention

Hereinafter, a method for charging a secondary battery according to a first embodiment of the present invention will be described with reference to the accompanying figures.

Figure 1A:
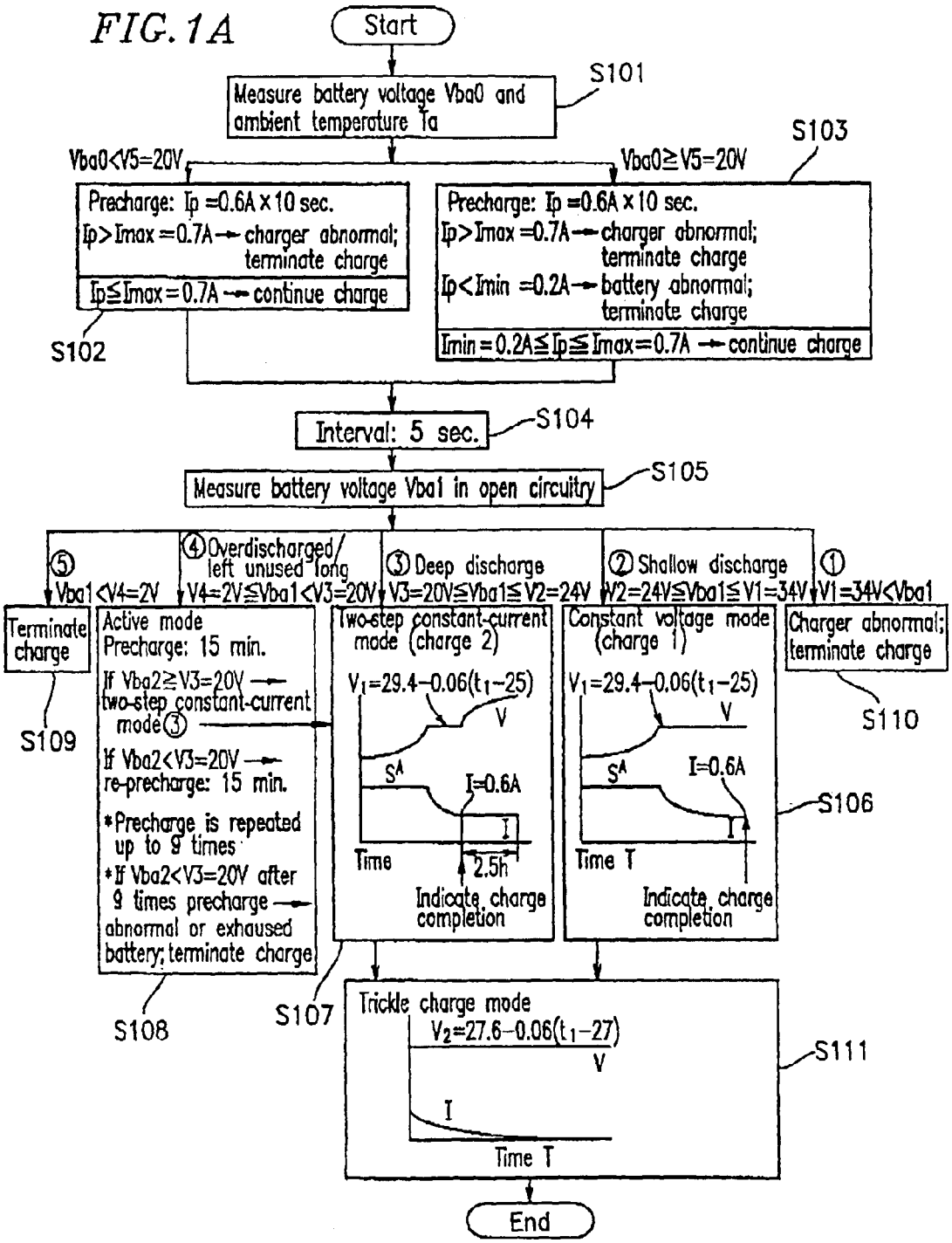
FIG. 1A is a flowchart illustrating a charge method for a secondary battery according to a first embodiment of the present invention.

FIG. 1A is a flowchart illustrating a charge method for a secondary battery according to a first embodiment of the present invention. It is assumed that the secondary battery to be charged in the illustrative embodiment is a sealed-type lead secondary battery.

Prior to charging the sealed-type lead secondary battery, a secondary battery voltage Vba0 and an ambient temperature Ta are measured (S101). Next, the sealed-type lead secondary battery is precharged (S102, S103). After an interval of about 5 seconds, a secondary battery voltage Vba1 is measured (S105).

Then, the secondary battery voltage Vba1 is compared against a first prescribed voltage V1, a second prescribed voltage V2, and a third prescribed voltage V3, where V3<V2<V1.

If the secondary battery voltage Vba1 is between the first prescribed voltage V1 and the second prescribed voltage V2, a first charging in a first charge mode is performed (S106). If the battery voltage Vba1 is between the second prescribed voltage V2 and the third prescribed voltage V3, a second charging in a second charge mode is performed (S107).

If the secondary battery voltage Vba1 is lower than the third prescribed voltage V3, an active charging is performed (S108). A cycle consisting of an active charging and an ensuing measurement of the secondary battery voltage Vba2 is repeated, within a predetermined cycle limit, until the secondary battery voltage Vba2 becomes higher than the third prescribed voltage V3. If the secondary battery voltage Vba2 becomes higher than the third prescribed voltage V3 within the predetermined cycle limit, a second charging in the second charge mode is performed (S108, S107). If the secondary battery voltage Vba2 has not become higher than the third prescribed voltage V3 within the predetermined cycle limit, the charge operation for the sealed-type lead secondary battery is terminated (S108). *Hereinafter, the term "main-charging" may be used to refer to one of the first charging in the first charge mode, the second charging in the second charge mode, and the active charging.*

If the secondary battery voltage Vba1 is higher than the first prescribed voltage v1, or if the secondary battery voltage Vba1 is lower than a fourth prescribed voltage V4 (where V4<V3), the charge operation is terminate (S110, S109). *Hereinafter, V4 may be referred to as a minimum prescribed voltage.*

In the case where the second secondary battery voltage Vba0 is equal to or greater than a prescribed voltage V5, either one of the following operations occurs: If a charge current Ip during the aforementioned precharging is equal to or smaller than Imax and equal to or greater than Imin (where Imin>0), the secondary battery voltage Vba1 after the precharging is measured (S103). If the charge current Ip during the precharging is greater than Imax, a warning message is displayed to indicate abnormal operation of the charger (charging device) and the charge operation is terminated (S103). If the charge current Ip during the precharging is smaller than Imin, a warning message is displayed to indicate abnormality of the battery and the charge operation is terminated (S103).

In the case where the secondary battery voltage Vba0 is lower than the fifth prescribed voltage V5, either one of the following operations occurs: If the charge current Ip during the aforementioned precharging is greater than Imax, a warning message is displayed to indicate abnormal operation of the charger (charging device) and the charge operation is terminated (S102). If the charge current Ip during the precharging is equal to or smaller than Imax, the secondary battery voltage Vba1 after the precharging is measured (S102).

Figure 1B:
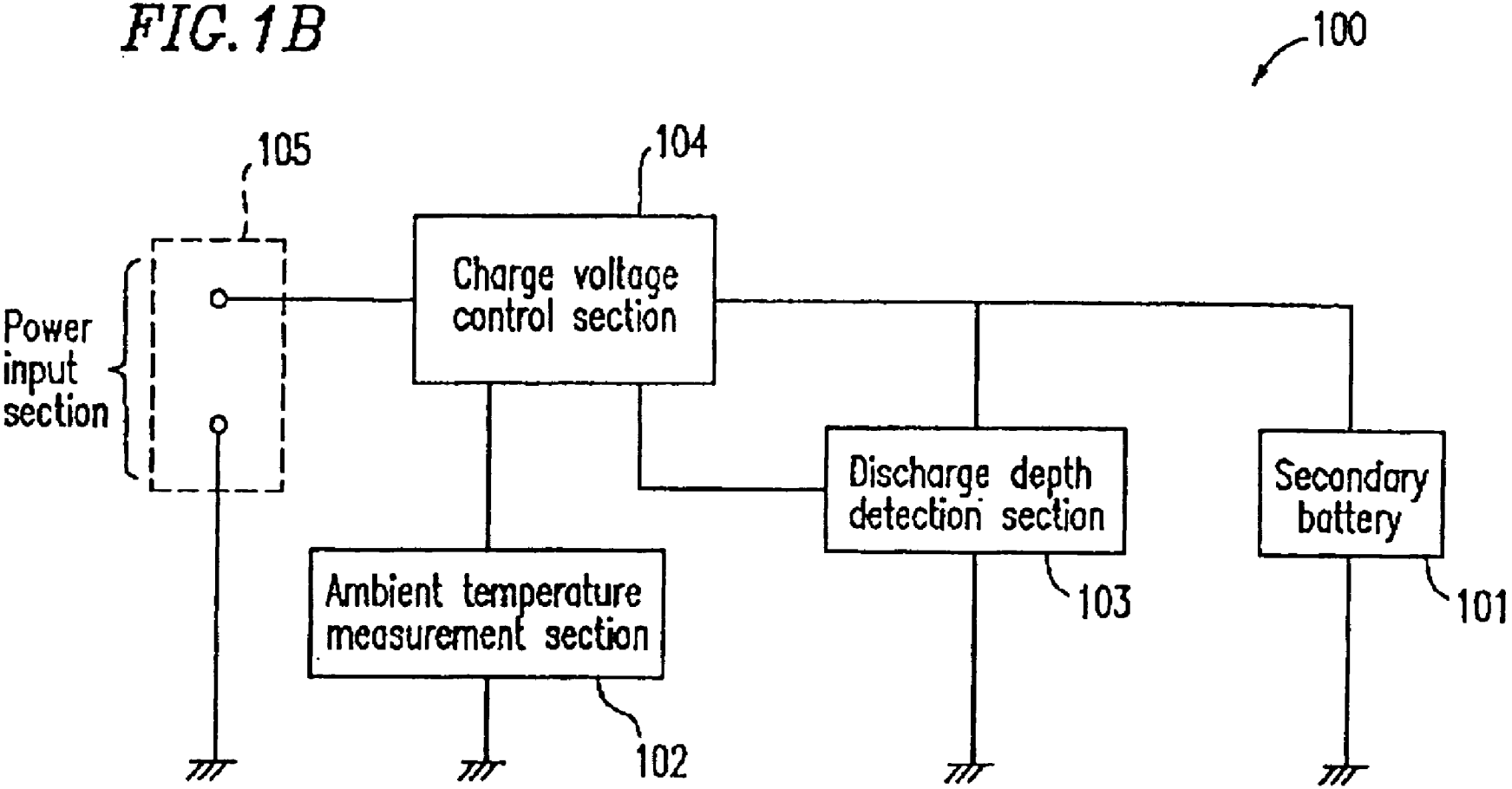
FIG. 1B is a block diagram illustrating a charger for a secondary battery according to the first embodiment of the invention.

FIG. 1B is a block diagram illustrating a charger (charging device) 100 for a secondary battery 101 according to the present embodiment of the invention.

The secondary battery charger 100 includes a charge voltage control section 104 for controlling the charge voltage of the secondary battery 101 at a level which is equal to or smaller than a predetermined value, an ambient temperature measurement section 102 for measuring the ambient temperature Ta during charging, a discharge depth detection section 103 for detecting the depth of discharge of the secondary battery 101, and a power supply section 105 for supplying power to the charge voltage control section 104.

The charge voltage control section 104 controls the charge voltage so as to maintain negative characteristics with respect to the ambient temperature Ta which is measured by the ambient temperature measurement section 102, and to maintain positive characteristics with respect to the discharge depth detected by the discharge depth detection section 103.

As used herein, a parameter value is said to have or maintain "positive characteristics" with respect to another parameter value when the former parameter value varies in proportion with the latter parameter value. Similarly, a parameter value is said to have or maintain "negative characteristics" with respect to another parameter value when the former parameter value varies in inverse proportion with the latter parameter value.

The discharge depth detection section 103 measures either the charge voltage at the beginning of the charge operation or the time which elapses between the beginning of the charge operation and the point at which the charge voltage reaches a predetermined voltage. The discharge depth detection section 103 detects the discharge depth by utilizing as a parameter either the charge voltage at the beginning of the charge operation or the time which elapses between the beginning of the charge operation and the point at which the charge voltage reaches the predetermined voltage.

Figure 2:
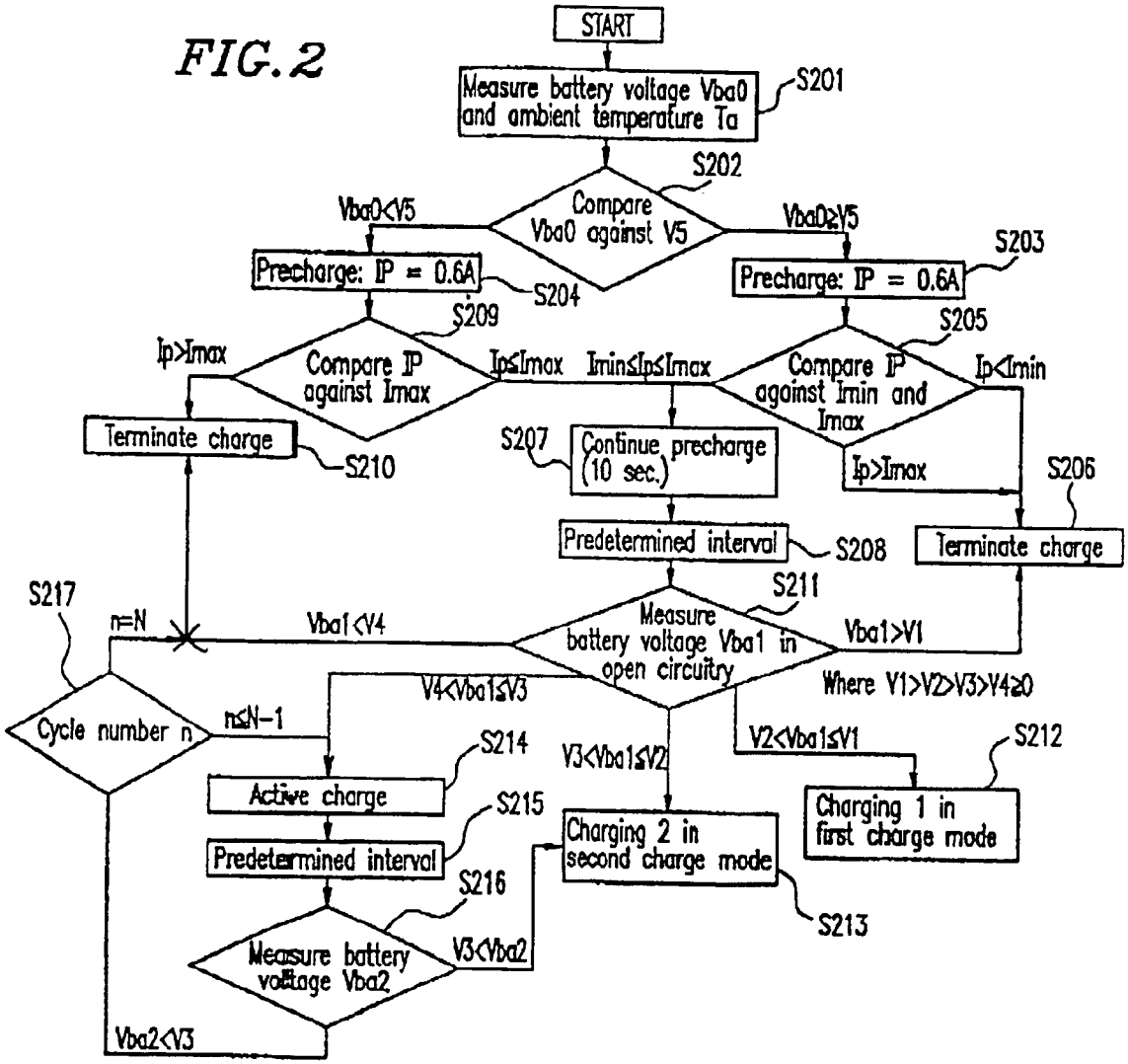
FIG. 2 is a detailed flowchart illustrating the charge method for a secondary battery according to the first embodiment of the present invention.

FIG. 2 is a detailed flowchart illustrating the charge method for a secondary battery according to the first embodiment of the present invention.

First, the secondary battery voltage Vba0 of the secondary battery in an open circuitry state is measured, and the ambient temperature Ta of a surrounding area of the secondary battery is measured (S201). The temperature measurements can be taken by a thermistor, for example.

After the measurement of the secondary battery voltage Vba0, a precharging is performed for a predetermined period of time using the charge current Ip (S203, S204). According to the present embodiment, measurements of the charge current Ip are utilized to detect an abnormality of the charger or the battery. Specifically, the secondary battery voltage Vba0 which was measured before the precharging is compared against the fifth prescribed voltage V5 (S202).

If the secondary battery voltage Vba0 is lower than the fifth prescribed voltage V5 and the charge current Ip during the aforementioned precharging is greater than Imax (as indicated by Ip>Imax at S209), or if the secondary battery voltage Vba0 is equal to or greater than the fifth prescribed voltage V5 and the charge current Ip during the aforementioned precharging is smaller than Imin (as indicated by Ip<Imin at S205), then the charge operation is terminated (S210, S206). This makes it possible to detect secondary batteries which have internal short-circuiting and/or secondary batteries which have deteriorated through excessive charging and discharging.

If the secondary battery voltage Vba0 which was measured before the precharging is equal to or greater than the fifth prescribed voltage V5 and the charge current Ip is greater than Imax, the charger is determined to be in an abnormal state and the charge operation is terminated (as indicated by Ip>Imax at S205).

After a predetermined interval following completion of the precharging, the secondary battery voltage Vba1 in an open circuitry stage is measured (S207, S208, S211). The present invention relies on the value of the secondary battery voltage Vba1 to determine the state (especially the discharge state) of the secondary battery.

As mentioned above, it is preferable to measure the secondary battery voltage Vba1 after a predetermined interval following completion of the precharging. It should be noted that determining the discharge state of the secondary battery based on a charge voltage value required during charging of the secondary battery, for example, might load to misdetection. The reason is that the charge voltage of the secondary battery may increase in the case where the secondary battery is overdischarged or left unused for a long period of time, and such an increased charge voltage may falsely produce an indication that the charging for the secondary battery is complete.

On the other hand, if the discharge state is determined based only on the secondary battery voltage in an open circuitry state, without performing any precharging, a large fluctuation may occur in the results of discharge state determination. The reason is that it is possible for secondary batteries which now have the same discharge state to later have various open circuitry voltages, depending on how the respective secondary batteries have been stored or maintained.

The aforementioned phenomenon will be further described. If a lead secondary battery which is in a certain discharge state is left unused, a thin layer of lead sulfate may form especially on the surface of the negative active material due to the self-discharging. Since such a layer in itself has a small self-discharge amount, the discharge state does not substantially change after the secondary battery has been left unused. However, the potential of the negative plate increases anodically so as to lower the secondary battery voltage.

In such cases, determining the discharge state based only on the open circuitry voltage of the secondary battery will falsely indicate too large a discharge depth for the actual discharge state, thereby preventing appropriate charging. Furthermore, the secondary battery voltage immediately after discharging is unstable due to concentration polarization of the electrolytic solution. Employing such an unstable voltage for the discharge state determination will greatly degrade the.

According to the present invention, the secondary battery voltage Vba1 in an open circuitry state is measured after a predetermined interval following completion of the precharging. As a result, the fluctuation in the results of discharge state determination is minimized so as to enable accurate discharge state determination. The precharging acts to reduce the thin layer of lead sulfate which has been generated due to slight self-discharging, and promotes the elimination of concentration polarization immediately after discharging, thereby making it possible to obtain a secondary battery voltage in an open circuitry state which reflects the actual discharge state.

According to the present invention, the secondary battery voltage Vba1 is used as a parameter for controlling the charge operation. Specifically, if the secondary battery voltage Vba1 is between the first prescribed voltage V1 and the second prescribed voltage V2 (where V2<V1), the discharge state of the secondary battery is determined as "shallow", and accordingly a first charging (charging 1) by a first charge mode is performed (S212).

If the secondary battery voltage Vba1 is between the second prescribed voltage V2 and the third prescribed voltage V3 (where V3<V2), the discharge state of the secondary battery is determined as "deep", and accordingly a second charging (charging 2) by a second charge mode is performed (S213).

If the secondary battery voltage Vba1 is even lower than the third prescribed voltage V3, the secondary battery is determined as having low charging acceptance due to overdischarging and the like, and accordingly an active charging is performed (S214). The active charging can be performed, for example, by using a constant current for a short period of time, so as to charge the passivation layer between the positive grid and the positive active material formed due to overdischarging and the enlarged lead sulfate (which has low charging acceptance) formed while the secondary battery has been left unused for a long time. Thus, the secondary battery can be revived for further charging.

After the active charging, the secondary battery is now considered as having a "deep" discharge state, so that it is subjected to a second charging (charging 2) in the second charge mode.

Depending on the extent of overdischarging and how long the battery has been left unused, the secondary battery may not be revived through a single active charging. Therefore, a cycle consisting of an active charging and an ensuing measurement of the secondary battery voltage Vba2 in an open circuitry state is repeated, within a predetermined cycle limit (N cycles), until the secondary battery voltage Vba2 becomes higher than the third prescribed voltage V3. Once the third secondary battery voltage Vba2 has become higher than the third prescribed voltage V3 within the predetermined cycle limit (N cycles), a second charging (charging 2) in the second charge mode is performed (S215, S216, S217, S213). If the third secondary battery voltage Vba2 has not become higher than the third prescribed voltage V3 within the predetermined cycle limit (N cycles), secondary battery abnormality or exhaustion is determined and the charge operation for the sealed-type lead secondary battery is terminated (S210).

For further security during the charge operation, it is preferable to determine charger abnormality or secondary battery abnormality/exhaustion if the secondary battery voltage Vba1 after the completion of precharging is higher than the first prescribed voltage V1, or if the secondary battery voltage Vba1 is lower than the fourth prescribed voltage V4 (where V4<V3), and to terminate the charge operation (S206, S210).

Next, a preferred embodiment of the first charging (charging 1) (S212) in the firat charge mode and the second charging (charging 2) (S213) in the second charge mode are described with reference to FIGS. 3 and 4.

Figure 3:
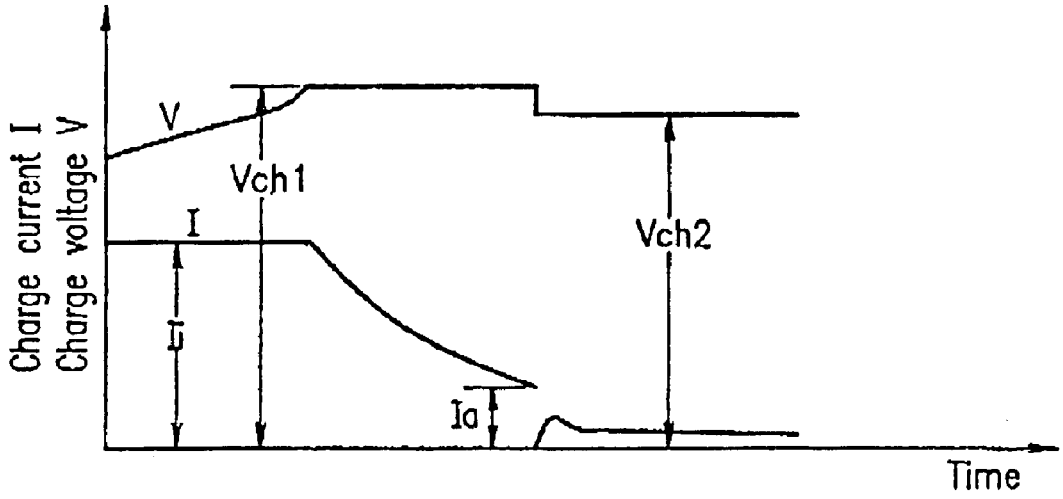
FIG. 3 is a graph illustrating a charge pattern of the first charging performed in the first charge mode in the charge method for a secondary battery according to the first embodiment of the present invention.

FIG. 3 is a graph illustrating a charge pattern of the first charging (charging 1) in the first charge mode. The first charging (charging 1) begins with a constant current charging (initial charge current: Ii(A)) in accordance with a first control voltage Vch1. After the charge voltage of the secondary battery has reached the control voltage Vch1, the charge current is decreased in accordance with a constant-voltage control. Once the charge current has decreased to a predetermined value Ia, the control voltage Vch1 for the charging is reduced to Vch2, where Vch2<Vch1. As a result, overcharging due to charging a secondary battery which has only experienced shallow discharging is prevented, thereby minimizing the decrease in the secondary battery lifetime.

Figure 4:
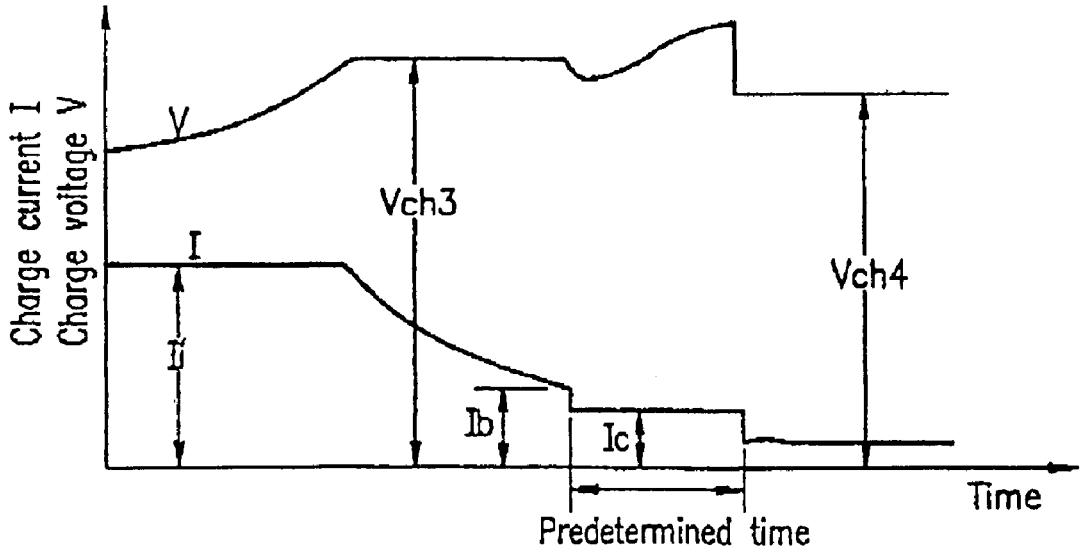
FIG. 4 is a graph illustrating a charge pattern of the second charging performed in the second charge mode in the charge method for a secondary battery according to the first embodiment of the present invention.

FIG. 4 is a graph illustrating a charge pattern of the second charging (charging 2) in the second charge mode. The second charging (charging 2) begins with a constant current charging (initial charge current: Ii(A)) in accordance with a third control voltage Vch3. After the charge voltage of the secondary battery has reached the third control voltage Vch3, the charge current is decreased in accordance with a constant-voltage control. Once the charge current has decreased to a predetermined value Ib, a constant-current charging is performed by using a current value Ic for a predetermined period of time. It will be appreciated that Ib and Ic may be of equal values.

The constant-current charging with the current value Ic prevents undercharging due to charging a secondary battery which has experienced deep discharging, thereby maximizing the lifetime of the secondary battery. Following the constant-current charging, charging is continued with a control voltage Vch4, where Vch4<Vch3.

The same value may be prescribed for both of the initial control voltages Vch1 and Vch3 used in the first charge mode and the second charge mode, respectively. In view of charging acceptance as a function of the ambient temperature during charging, it is preferable to control the control voltages Vch1 and Vch3 so as to maintain negative characteristics with respect to the ambient temperature Ta measured prior to the charging, thereby maximizing the effects attained by the present invention.

It is also possible to prescribe the same value for the second control voltage Vch2 and the fourth control voltage Vch4 so that the relevant portion of the charge voltage control section can be used in both the first charge mode and the second charge mode, thereby effectively reducing the charger cost. It is also preferable to control the control voltages Vch2 and Vch4 so as to maintain negative characteristics with respect to the ambient temperature Ta.

First Embodiment of the Invention—Example 1

Figure 5:
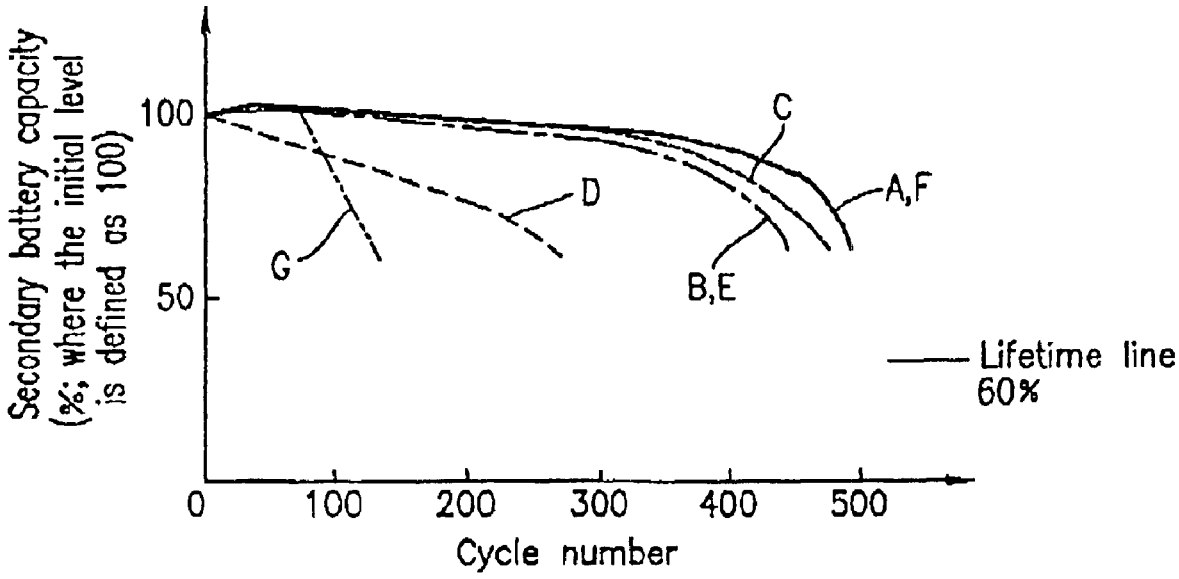
FIG. 5 is a graph illustrating the respective cycle life characteristics of a sealed-type lead secondary battery obtained by using the charge method according to the first embodiment of the present invention and a charge method according to a conventional example.

Referring to FIG. 5, Example 1 of a first embodiment of the present invention will be described.

The inventors conducted charge/discharge cycle life tests on a sealed-type lead secondary battery which had a nominal voltage of 24 V and a 10-hour rated capacity of 28 Ah by using the charge method according to the first embodiment of the invention.

The following parameter values were used in the tests:

Current value during precharging

Ip: 0.6 A

Imax: 0.7 A

Imin: 0.2 A

Precharging: 10 sec.

Measurement timing for secondary battery voltage Vba1:

5 sec. after completion of precharging first prescribed voltage V1: 34 V second predscribed voltage V2: 24 V third prescribed voltage V3: 20 V fourth prescribed voltage V4: 2 V fifth prescribed voltage V5: 20 V initial charge current Ii: 5 A first control voltage Vch1: 29.4−0.06(Ta-25)

second control voltage Vch2: 27.6−0.06(Ta-25)

predetermined current Ia: 0.6 A third control voltage Vch3: 29.4−0.06(Ta-25)

fourth control voltage Vah4: 27.6−0.06(Ta-25)

current value Ib: 0.6 A current value Ic: 0.6 A active charge current: 0.6 A active charge time: 15 min./cycle cycle limit for active charge N: 9 cycles (In the above parameter conditions, Ta represents the ambient temperature (° C.).)

Three discharge conditions A, B, and C were used in the test:

Condition A (indicated as A in FIG. 5):

perform discharge ① (discharge for 2.4 hs with a constant current of 7 A (about 60% discharge of the rated capacity)).

Condition B (indicated as B in FIG. 5):

perform discharge ② (discharge for 22 min with a constant current of 7 A (about 10% discharge of the rated capacity)).

Condition C (indicated as C in FIG. 5):

perform discharge ① for odd-numbered cycles and perform ② for even-numbered cycles.

As conventional examples, tests were conducted for the same 24 V/28 Ah secondary battery (described above) but using discharge conditions D, E, F, and G as follows:

Condition D (indicated as D in FIG. 5):

perform discharge ①, followed by a charging 1 in the first charge mode alone.

Condition E (indicated as E in FIG. 5):

perform discharge ①, followed by a charging 2 in the second charge mode alone.

Condition F (indicated as P in FIG. 5):

perform discharge ② followed by a charging 1 in the first charge mode alone.

Condition G (indicated as G in FIG. 5):

perform discharge ②, followed by a charging 2 in the second charge mode alone.

Each test was performed for a charge time of 12 hours. The capacity of the secondary battery was measured by allowing the secondary battery to completely discharge down to 21 V (with 7 A) per every 20 cycles. The results of these test are shown in FIG. 5.

From the results shown in FIG. 5, it can be seen that, in accordance with the first embodiment of the invention, appropriate charging can always be performed by detecting any change in the discharge depth of the sealed-type lead secondary battery used. In accordance with the invention all of the tested sealed-type lead secondary batteries stably exhibit a lifetime of about 450 to about 500 cycles without substantial variation.

In accordance with the conventional examples, however, the battery lifetime is under a large influence by the discharge depth and the charge method, resulting in a variety of lifetimes from about 150 to about 500 cycles. Such instability indicates that short lifetimes may be incurred due to variation in the manner In which a device associated with such a sealed-type lead secondary battery is used by a user.

First Embodiment of the Invention—Example 2

Next, a overdischarged battery was prepared by coupling the 24 V/28 Ah sealed-type lead secondary battery employed in Example 1 to a fixed resistor of 2Ω for 24 hours, after which the secondary battery was left unused for 1 month. Thereafter, this overdischarged battery was subjected to a 5-cycle process, where each cycle consisted of a charging in accordance with Example 1 of the first embodiment of the invention and a constant-current (7 A) discharging (final voltage: 21 V) (condition H; indicated as H in FIG. 6).

Figure 6:
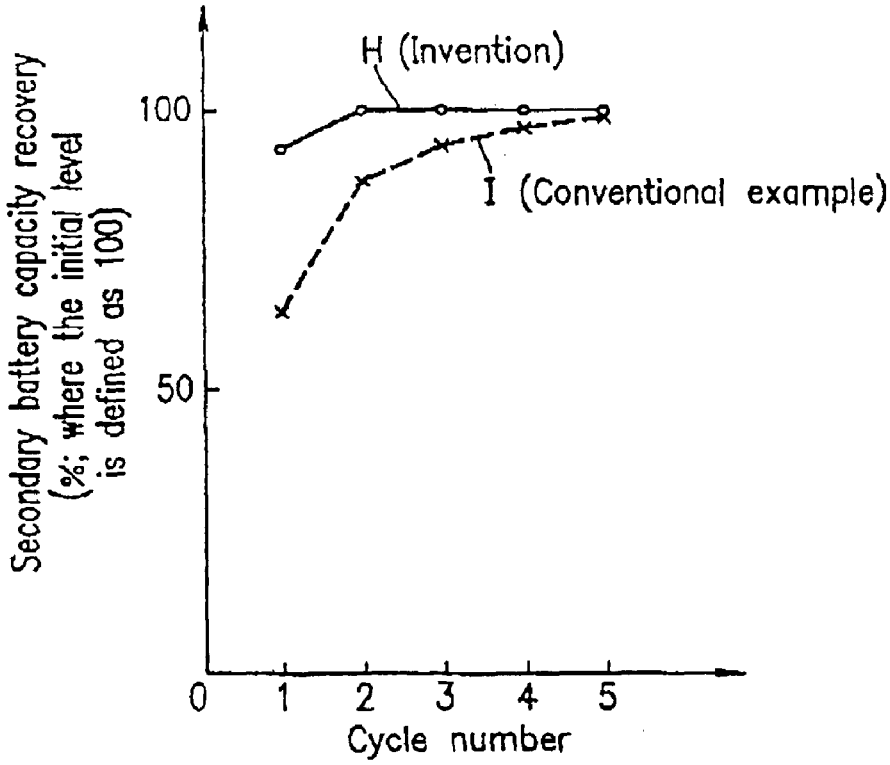
FIG. 6 is a graph illustrating the respective capacity recovery characteristics of a sealed-type lead secondary battery which has been overdischarged, obtained by using the charge method according to the first embodiment of the present invention and a charge method according to a conventional example.

As a conventional example, a similarly-prepared overdischarged battery was subjected to a 5-cycle process, where each cycle consisted of a charging 2 in the second charge mode alone and a constant-current (7 A) discharging (final voltage: 21 V) (condition I; indicated as I in FIG. 6). The results of these test are shown in FIG. 6.

From the results shown in FIG. 6, it can be seen that, in accordance with the first embodiment of the invention, a sufficient discharge capacity is already attained at the first cycle. On the other hand, the conventional example takes three cycles to attain the level of discharge capacity that is attained at the first cycle in accordance with the first embodiment of the invention.

Thus, in accordance with the first embodiment of the invention, overdischarging of a secondary battery in detected, upon which the secondary battery in subjected to active charging. The active charging serves to restore sufficient capacity within a relatively few cycles. As a result, unwanted and unexpected decrease in the capacity of the secondly battery can be prevented for the convenience of the user of a device associated with the secondary battery.

Thus, in accordance with the first embodiment of the invention, appropriate charging can always be performed by detecting any user-induced variation in the discharge depth of a secondary battery (in particular a sealed-type lead secondary battery). An a result, the sealed-type lead secondary battery can enjoy an enhanced longevity, thereby making a substantial contribution in the industry.

Second Embodiment of the Invention

Hereinafter, a method for charging a secondary battery according to a second embodiment of the present invention will be described with reference to the accompanying figures.

Figure 7:
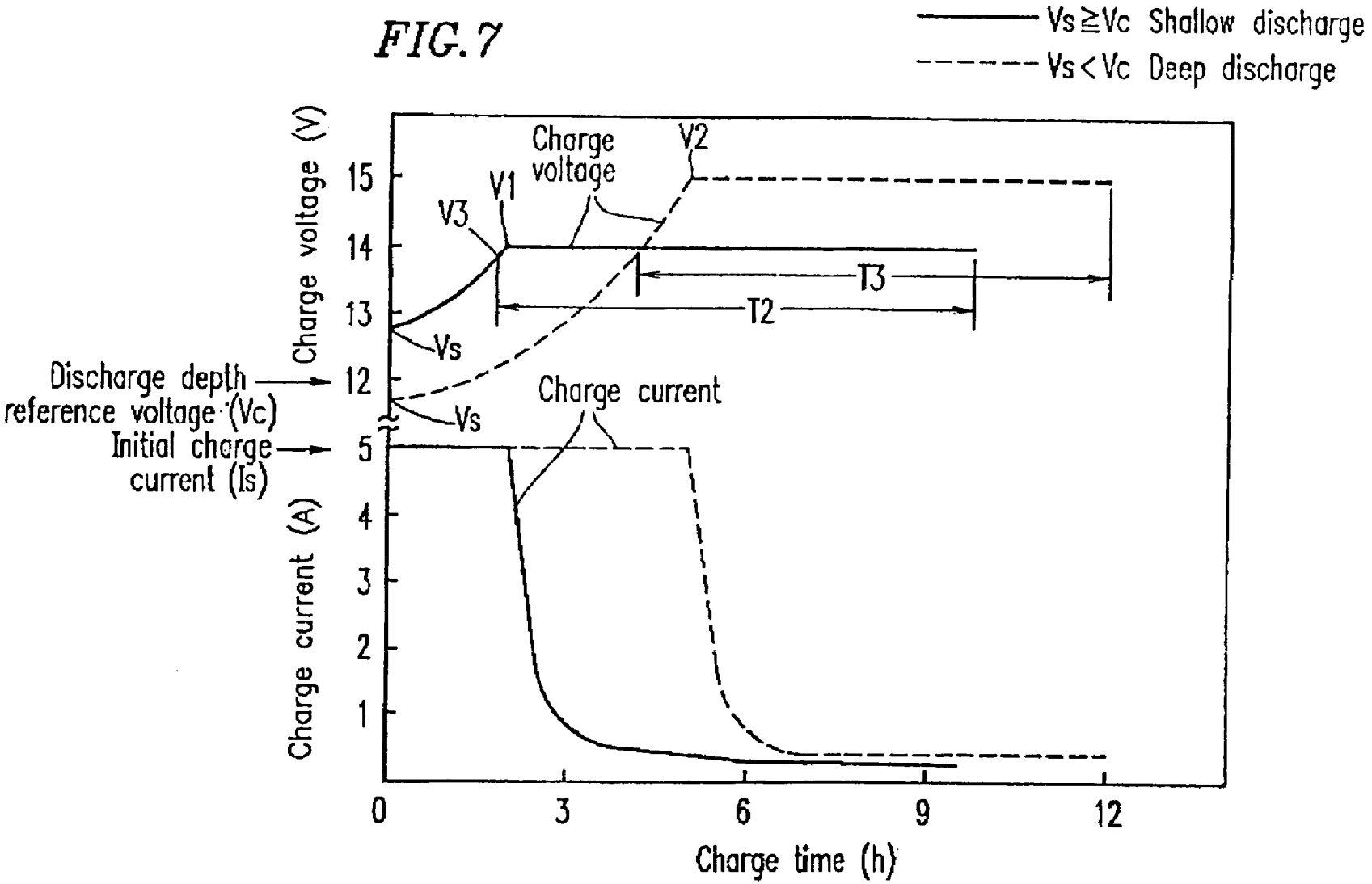
FIG. 7 is a graph illustrating the charge characteristics according to the second embodiment of the present invention.

FIG. 7 is a graph illustrating the charge characteristics of the charge method according to the second embodiment of the invention. First, a constant-current charging with an initial charge current Is is performed for a lead secondary battery. The charge voltage (Vs) immediately after the charging in begun is measured. The value of Vs is compared against a discharge depth reference voltage (Vc). If Vs≧Vc, a shallow discharge state is determined (i.e., discharge depth of about 50% or less).

Then, a constant-voltage charge is performed by using a control voltage V1 (≦2.4 V/cell; indicated by the solid line in FIG. 7) which is lower than the charge control voltage V2 for a deep discharge state (indicated by the broken line in FIG. 7). It is preferable to employ a timer so that the charge is terminated after the lapse of a predetermined period of time (T2) from the point at which the charge voltage reaches a predetermined value (V3), for example, in order to secure a proper charge electricity amount within a predetermined charge time.

Toward the same end, it is also possible to prescribe shorter charge times T2, T3 as a higher charge control voltage is employed. It is preferable that the respective control voltages satisfy V3<V1, V2 to ensure a secure detection despite any fluctuation in the detected voltage, although It is also applicable to use V3=V1, V2.

Second Embodiment of the Invention—Modification

Figure 8:
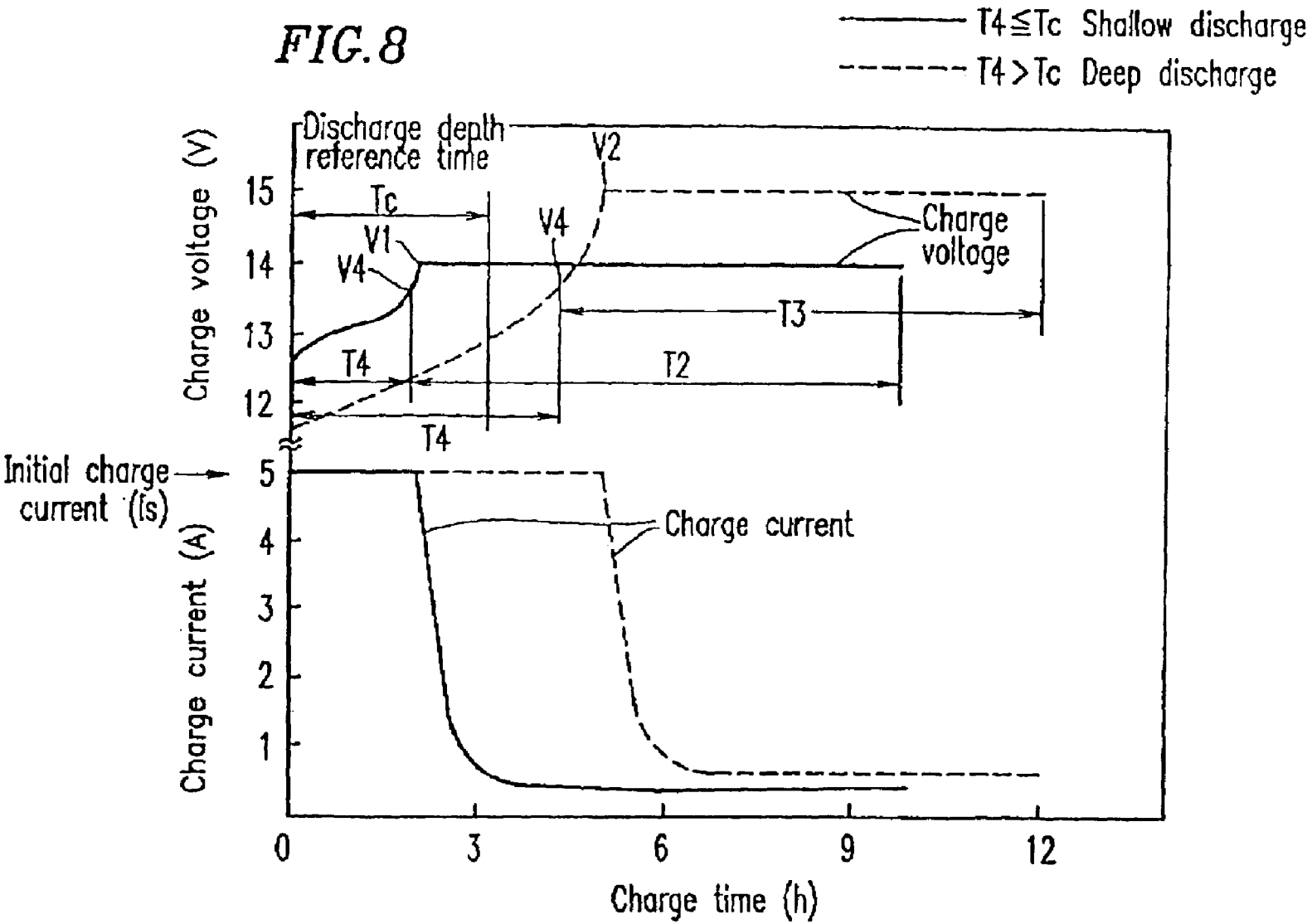
FIG. 8 is a graph illustrating a modification of the charge characteristics according to the second embodiment of the present invention.

FIG. 8 is a graph illustrating one modification of the charge pattern according to the second embodiment of the present invention, where a different method for determining the discharge depth is employed. Specifically, a constant-current charging is performed with an initial charge current (Is), and the time (T4) which elapses from the beginning of charging until the charge voltage reaches a predetermined voltage value (V4) is measured. The measured time T4 is compared against a discharge depth reference time (Tc). If T4≦Tc, a shallow discharge state is determined (i.e., discharge depth of about 50% or less). Thereafter, the charging is controlled in the same manner as in the case of Vs≧Vc in the second embodiment of the invention.

In the above-described second embodiment of the invention and the modification thereof, the charge control which is performed in the case of determining a shallow discharge state (i.e., discharge depth of about 50% or less) is illustrated as a single level constant-voltage control using a timer. However, the present invention is not limited thereto; multiple levels of constant-voltage control may be performed depending on the value of Vs or T4 for even better charging.

Second Embodiment of the Invention—Example 1

Figure 12:
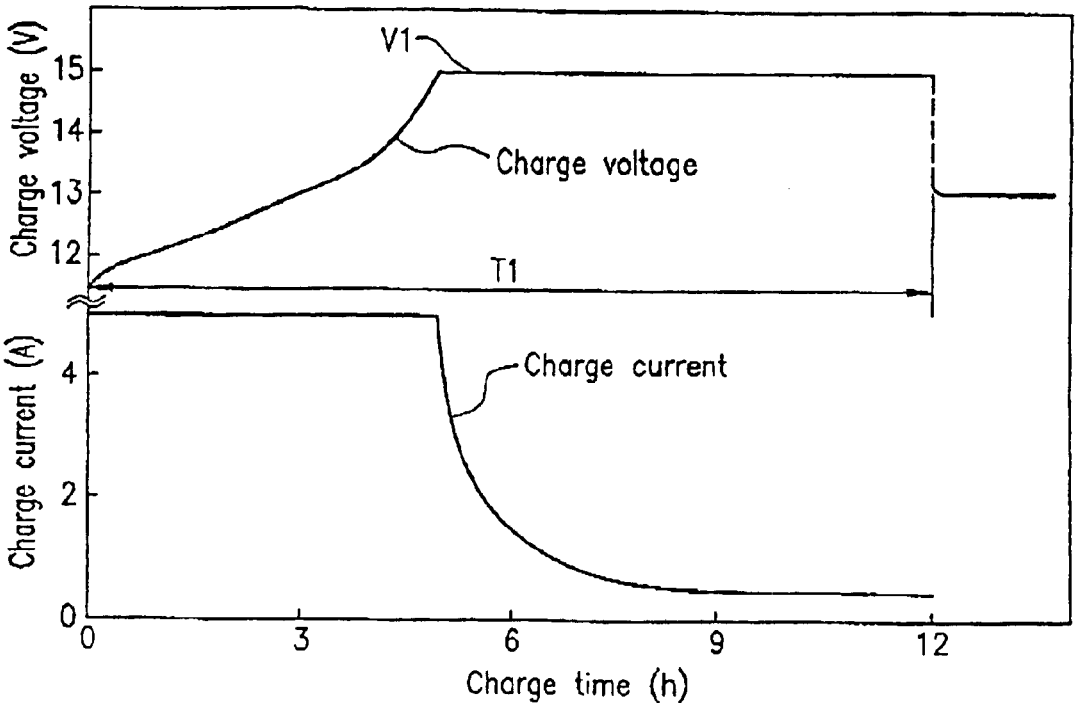
FIG. 12 is a graph illustrating the charge characteristics of a conventional constant-voltage charge method.

For a preliminary experiment, a cycle life test was performed for 12 V/30 Ah lead secondary batteries by using a conventional charge method illustrated in FIG. 12. The charge method employed a charge control voltage V1 of 15.0 V (at 25° C.), a maximum charge current of 5.0 A, and a charge time of 12 hours. The discharge was performed to various discharge depths by varying the discharge time with a constant current of 7.5 A. The charging and discharging were repeated.

After every 50 cycles of these charging and discharging, the capacity of each battery was checked by subjecting the battery to complete discharge with a constant current of 7.5 A, down to a final voltage of 10.5 V. The exhaustion, or expiration of lifetime, of the battery was determined when the discharge capacity reached about 50% or lose of the initial value.

As a positive grid alloy, the tested batteries incorporated either a Pb—Ca(0.08%)-Sn(1.0%) alloy, which is a conventionally employed Pb—Ca type alloy, or a Pb—Sb (3.0%)-As(0.2%) alloy, which is a Pb—Sb type alloy mainly employed for liquid-type lead secondary batteries.

An electrolytic solution having a specific gravity of 1.320 (20° C.) was used for the lead secondary batteries incorporating a Pb—Sb type positive grid alloy. Various electrolytic solutions having a specific gravity of 1.260 to 1.340 were used for the lead secondary batteries incorporating a Pb—Ca type positive grid alloy in order to confirm the influence of the specific gravity of the electrolytic solution on the cycle life.

Figure 9:
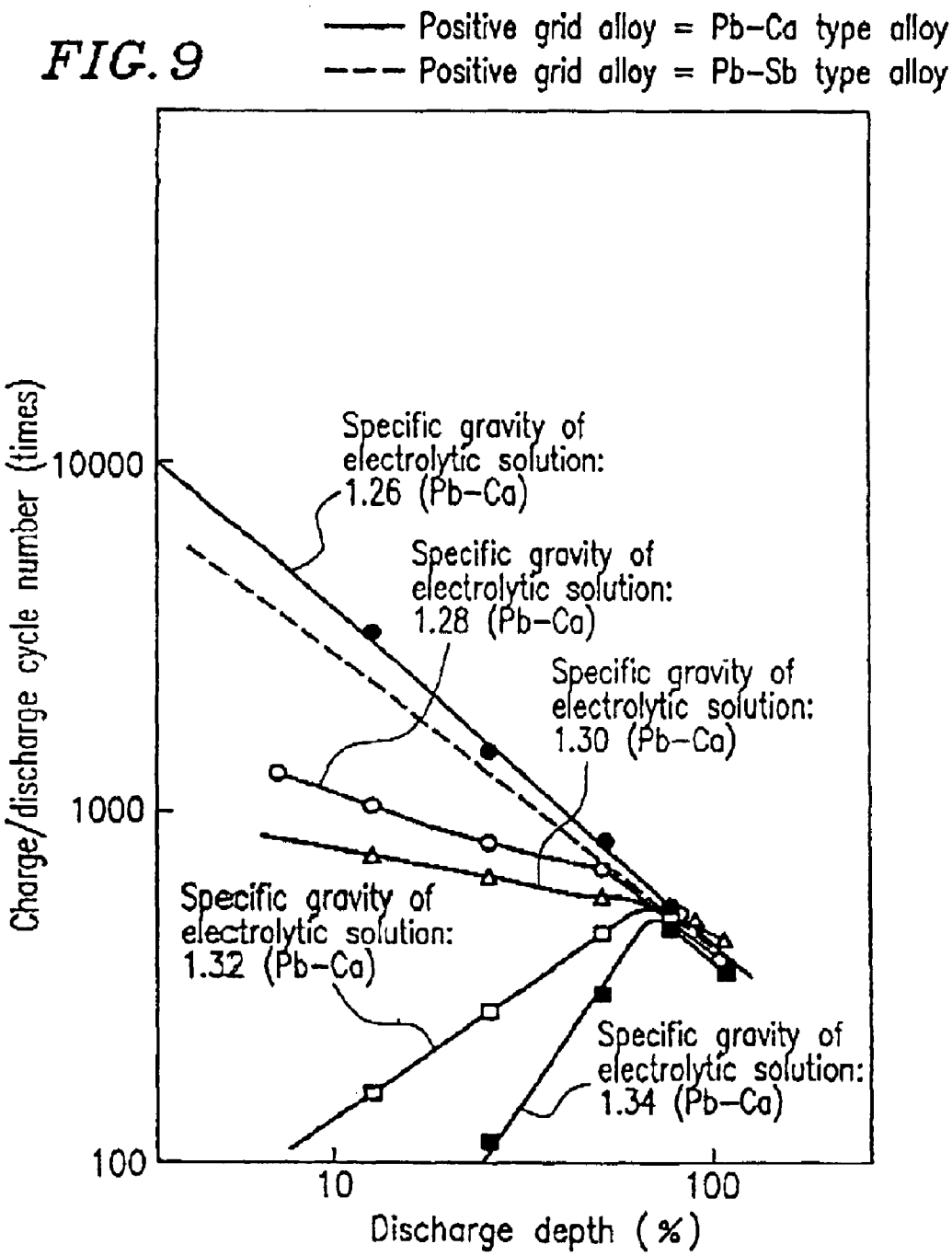
FIG. 9 is a graph illustrating the results of a cycle life test with respect to various positive grip alloys, electrolytic solutions with various specific gravity values, and various discharge depths in a preliminary experiment according to the second embodiment of the present invention.

The results are shown in FIG. 9. As seen from FIG. 9, a decrease in the cycle life of the lead secondary batteries incorporating a Pb—Ca type positive grid alloy was observed in a region corresponding to an electrolytic solution specific gravity of 1.280 or more (20° C.) and a discharge depth of about 50% or less. This decrease in the cycle life was caused by a decrease in the capacity of the positive plate. Moreover, a passivated accumulation of lead sulfate was observed near the interface between the positive active material, which had been converted into lead dioxide through charging, showed softening presumably due to overcharging. It is presumed, without certainty, the unevenness in the discharge distribution due to partial discharge is involved in the softening of the positive active material.

Figure 10:
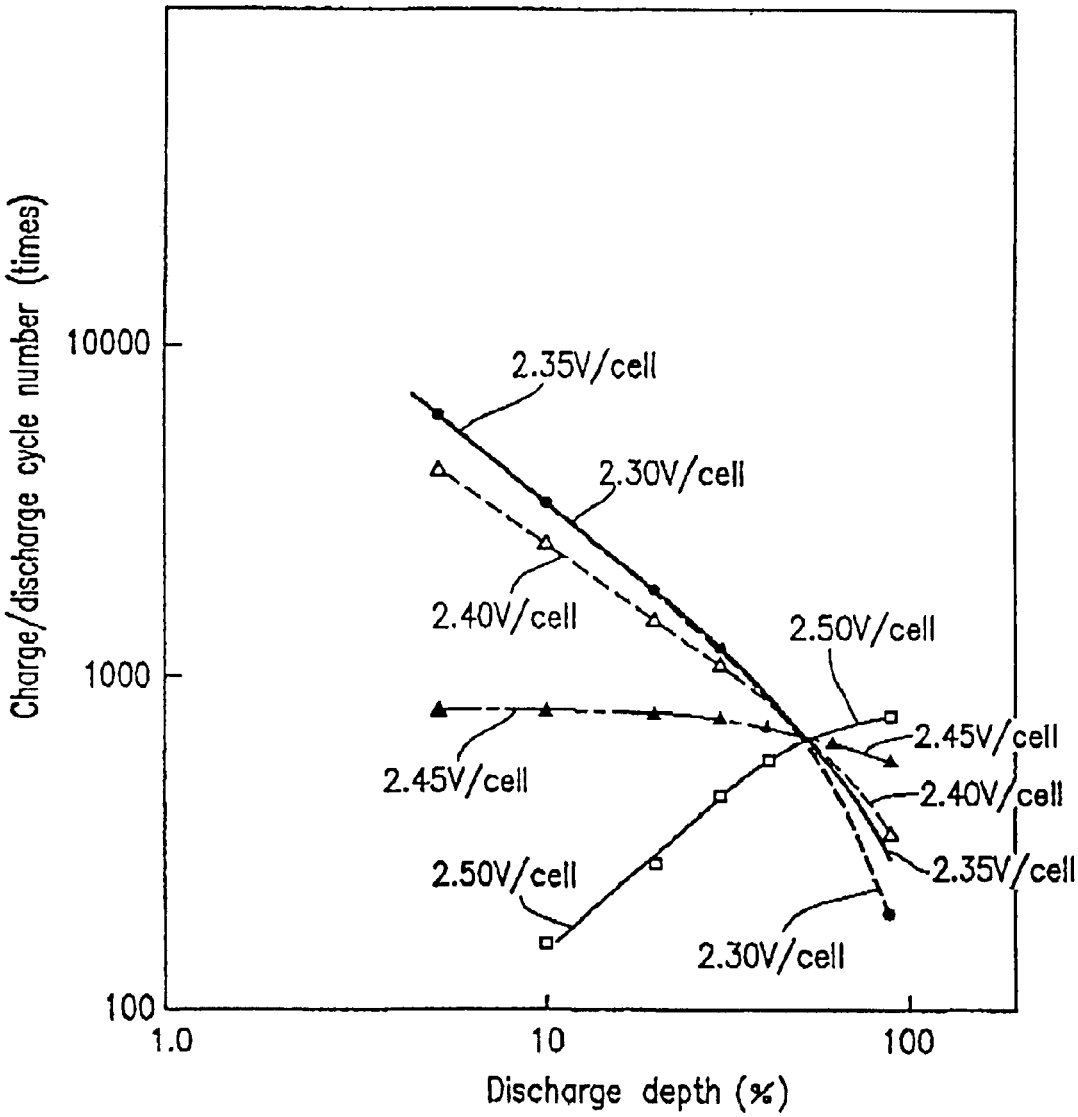
FIG. 10 is a graph illustrating the results of a cycle life test with respect to various charge control voltages and various discharge depths in a preliminary experiment according to the second embodiment of the prevent invention.

Next, a cycle life test was performed by employing various charge control voltages in the above-described preliminary experiment. The results are shown in FIG. 10. The batteries used in the test incorporated a Pb—Ca type positive grid alloy, and an electrolytic solution having a specific gravity of 1.320 at 20° C. was used.

From the results shown in FIG. 10, it can be seen that the decrease in the cycle life is reduced by employing a charge control voltage of 2.40 V/cell or less in a region corresponding to a discharge depth of about 50% or less, while a conspicuous decrease in the cycle life was observed in a region corresponding to large discharge depths due to insufficient charging. The reduced decrease in the cycle life in the region corresponding to small discharge depths was presumably a result of a relatively uniform charge reaction, which was made possible by lowering the charge voltage to about 2.40 V/cell.

In the case of employing a high charge voltage, where a large extent of anodic polarization of the positive plate occurs during charging, a charge reaction progresses in a region with relatively high charging acceptance. However, in other regions, the generation of gaseous oxygen may occur rather than an oxidation reaction into lead dioxide, thereby resulting in an accumulation of lead sulfate. It in also presumable that the portion which has been converted into lead dioxide is subjected to charging with an increased priority, thereby resulting in overcharging and hence reduced lifetime.

In the second embodiment of the invention where a charge control voltage of 2.40 V/cell or less is employed, it is predicated that a small degree of anodic polarization exists so that the charge react on progresses in a relatively slow and uniform manner. This presumably causes the unevenly distributed lead sulfate (which resulted due to a partial reaction) to effectively react into lead dioxide, thereby substantially eliminating overcharging in other portions and minimizing the decrease in cycle life.

Thus, it has been confirmed that the method according to the present embodiment of controlling the charge voltage by detecting the discharge depth in applications which may result in various discharge depths can effectively minimize the decrease in cycle life.

Second Embodiment of the Invention—Example 2

Cycle life tests were conducted for the aforementioned 12V/30 Ah lead secondary batteries in an atmosphere at a temperature of 25° C., by employing charge methods according to the second embodiment of the invention as illustrated in FIG. 7 and according to a conventional charge method for comparison.

① The charge method according to the second embodiment of the invention was performed under the conditions of:
initial charge current (Is)=5.0 A;
discharge depth reference voltage (Vc)=12.0 V;

and, (a) in the case where Vs≧Vc (where Vs is the charge voltage immediately after the charging is begun), the following conditions were used:

charge control voltage (V1)=14.1 V (2.35 V/cell)

charge time: A timer is started when the charge voltage reaches V3 (=14.0 V) and the charging is terminated in 8 hours after the timer is started;

or (b) in the case where Vs<Vc, the following conditions were used:

charge control voltage (V1)=15.0 V (2.50 V/cell)

charge times: A timer is started when the charge voltage reaches V3 (=14.0 V) and the charging is terminated in 8 hours after the timer is started.

② The conventional charge method was performed under the conditions of:

initial charge current (Is)=5.0 A;

charge control voltage=14.7 V; and charge time=12 hours.

By employing the charge method according to Example 2 of the second embodiment of the invention and by employing the conventional charge method an described above, cycle life comparative tests were conducted with respect to electrolytic solutions with various specific gravity values, various positive grid alloys, and various discharge depths. The results are shown in FIG. 11.

Figure 11:
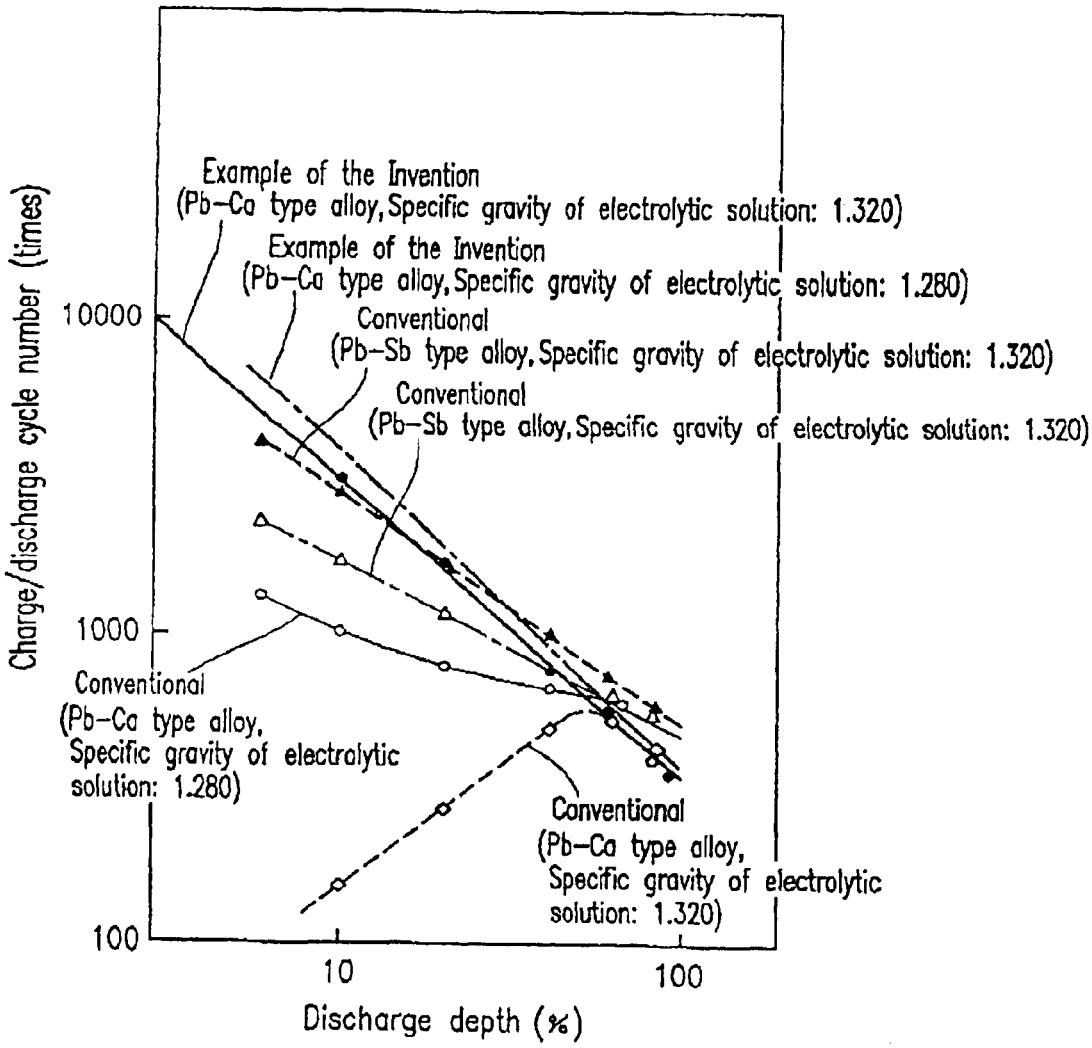
FIG. 11 is a graph illustrating the results of a cycle life test with respect to various discharge depths, obtained by the charge method according to the second embodiment of the present invention and a charge method according to a conventional example.

From the results shown in FIG. 11, it can be seen that the decrease in cycle life, in the problematic region corresponding to a discharge depth of about 50% or less, was successfully minimized for lead secondary batteries employing a Pb—Ca type positive grid alloy and an electrolytic solution with a specific gravity of 1.280 or more. Incidentally, the charge electricity amount in a region corresponding to small discharge depths indicated an excellent value of about 105% to about 113% of the discharge electricity amount, with substantial stability.

It is preferable to change the charge control voltage value with respect to a reference discharge depth of about 50%. This charge method is especially useful for lead secondary batteries incorporating a Pb—Ca type positive grid alloy. It will be appreciated that the charge method according to the second embodiment of the invention is very useful especially for sealed-type lead secondary batteries, which cannot incorporate a Pb—Sb type positive grid alloy for structural reasons.

As has been described with respect to the aforementioned modification of the second embodiment of the invention, in accordance with Example 2 of the second embodiment of the invention, the time which elapses from the beginning of charging until the charge voltage reaches a predetermined voltage value can be used as a parameter to indicate the discharge depth because the elapsed time will decrease as the discharge depth becomes small and the time will increase as the discharge depth becomes large.

Although the present example employe a discharge depth reference voltage Vs of 12.0 V, this value is susceptible to changes depending on various design factors of each individual secondary battery and should be adjusted according to such design factors. Similarly, the time which elapses from the beginning of charging until the charge voltage reaches a predetermined voltage value should be determined according to such design factors.

It will be appreciated that it is preferable to prescribe the control voltage values so as to maintain negative characteristics with respect to the ambient temperature Ta. The reason is that an increase in the ambient temperature Ta, even with the same charge control voltage, may result in the same behavior as if there is enhanced polarization, for example. This must be compensated for by decreasing the charge voltage.

Thus, according to the charge method of the second embodiment of the invention, the decrease in cycle life, in the region corresponding to a small discharge depth, can be minimized for lead secondary batteries employing a Pb—Ca type positive grid alloy and an electrolytic solution with a specific gravity of 1.280 or more at 20° C. The charge method according to the second embodiment of the invention is very useful especially for sealed-type lead secondary batteries, for which a Pb—Ca type positive grid alloy is indispensable.

Third Embodiment of the Invention

Figure 13:
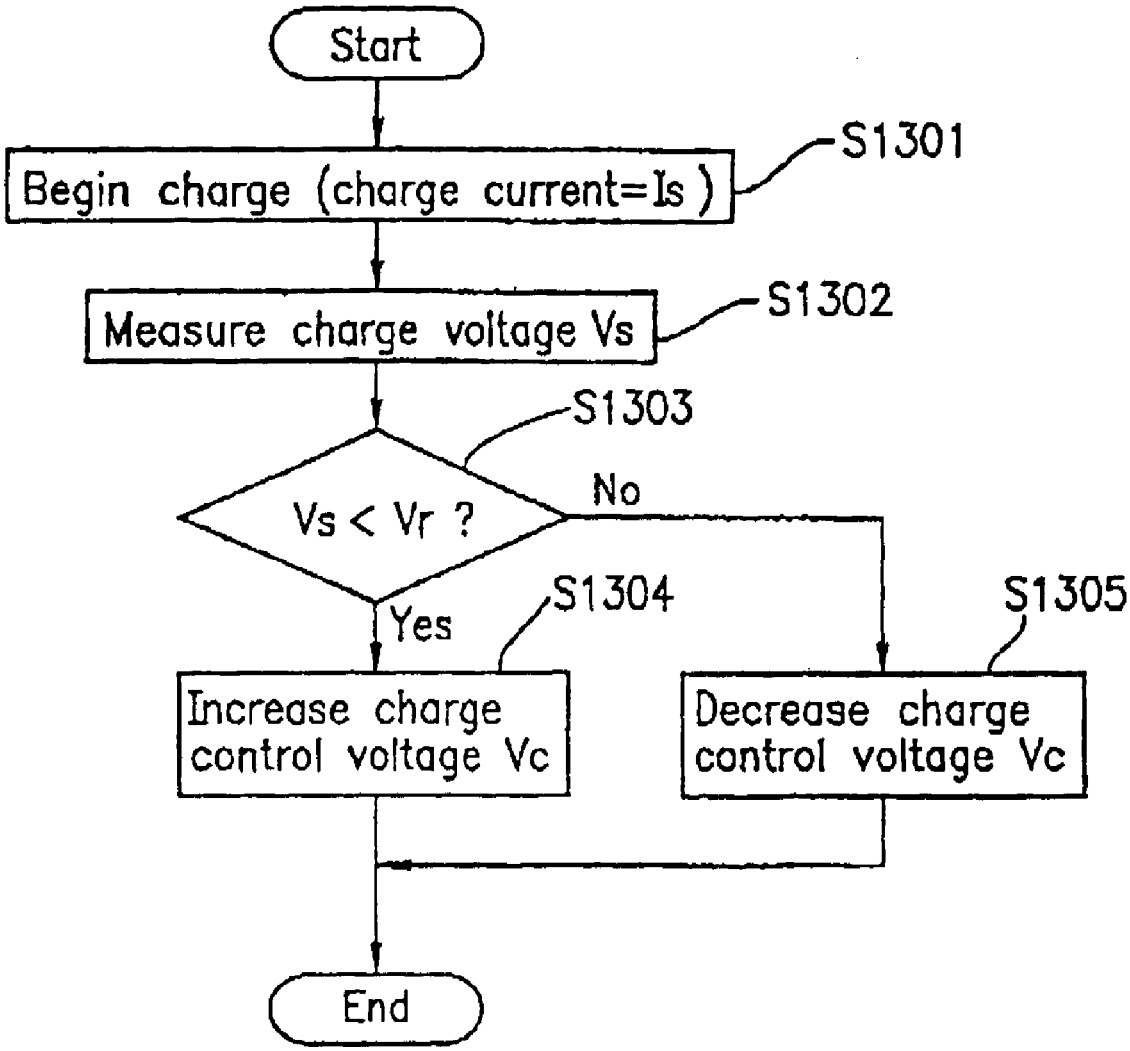
FIG. 13 is a flowchart illustrating a charge method according to a third embodiment of the present invention.

FIG. 13 is a flowchart illustrating a charge method according to a third embodiment of the present invention. First, the secondary battery is charged with an initial charge current Is (S1301). A charge voltage Vs immediately after the charging is begun is measured (S1302). The Vs value is compared against a discharge depth reference voltage Vr (S1303). If Vs is equal to or greater than Vr, the discharge depth is determined as small (i.e. "shallow") so that the charge control voltage Vc is decreased (S1305). If Vs is lower then Vr, the discharge depth is determined as large (i.e., "deep") so that the charge control voltage Vc is increased (S1304).

Figure 14:
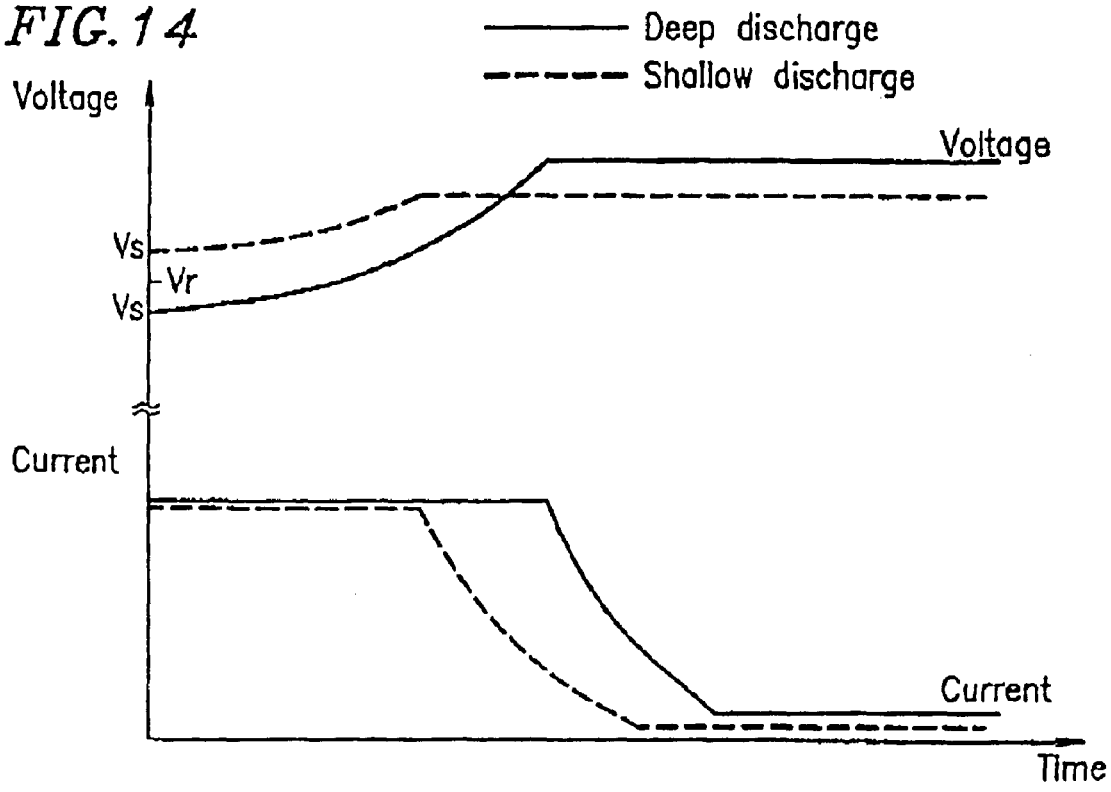
FIG. 14 is a graph illustrating the charge characteristics according to the third embodiment of the present invention.

FIG. 14 is a graph illustrating the charge characteristics according to the third embodiment of the present invention, where the solid line indicates the case where a deep discharge depth is determined and the broken line indicates the case where a shallow discharge depth is determined.

Third Embodiment of the Invention—Modification

Figure 15:
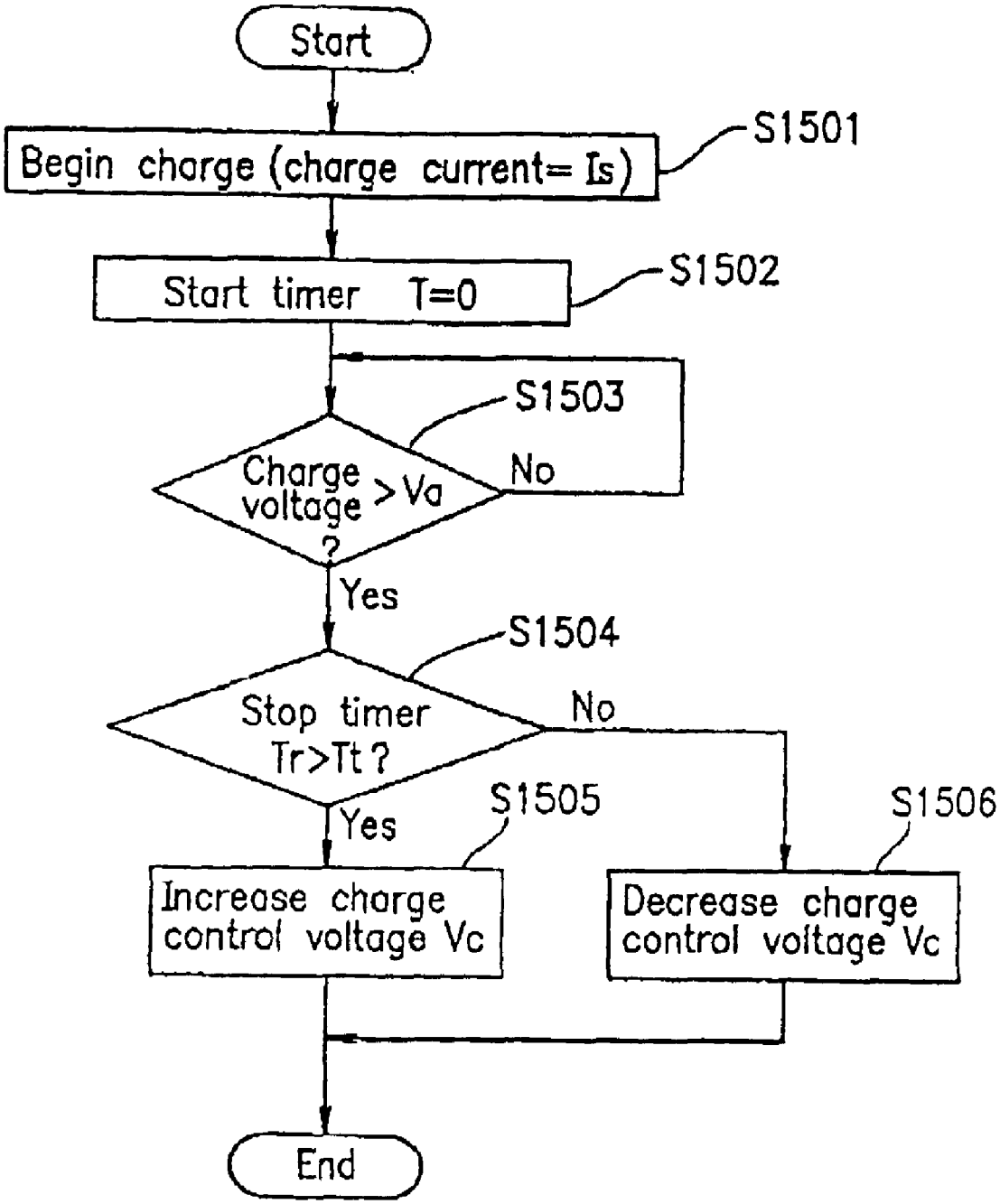
FIG. 15 is a flowchart illustrating a modification of the charge method according to the third embodiment of the present invention.

FIG. 15 is a flowchart illustrating a modification of the charge method according to the third embodiment of the present invention.

First, the secondary battery is charged with an initial charge current Is (S1501), and a timer is started to measure time (S1502). The timer stops as the charge voltage reaches a predetermined voltage Va, thereby measuring the time Tt which elapses from the beginning of charging until the charge voltage reaches Va (S1503). The time Tt is compared against a discharge depth reference time Tr (S1504). If Tr is greater than Tt, the discharge depth is determined as large (i.e. "deep") so that the charge control voltage Vc is increased (S1505). If Tr is equal to or smaller than Tt, the discharge depth to determined as small (i.e. "shallow") so that the charge control voltage Vc is decreased (S1506).

Figure 16:
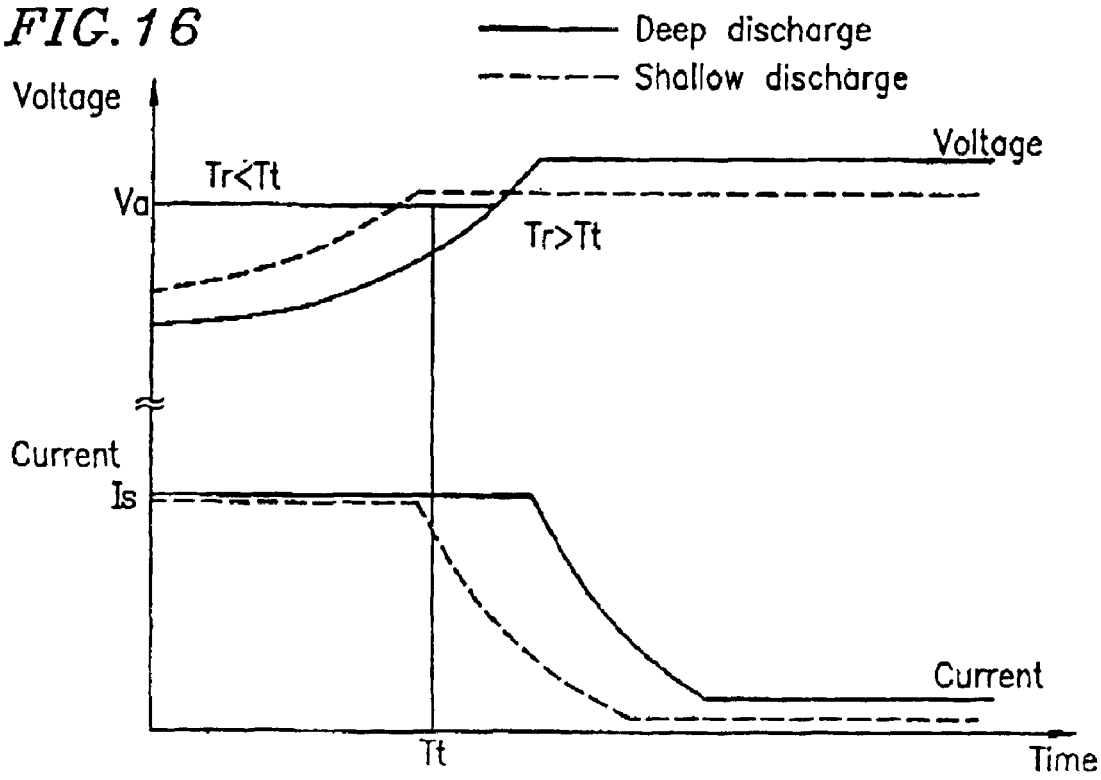
FIG. 16 is a graph illustrating the charge characteristics according to a modification of the third embodiment of the present invention.

FIG. 16 is a graph illustrating the charge characteristics according to the present modification of the third embodiment of the invention, where the solid line indicates the case where a deep discharge depth is determined and the broken line indicates the case where a shallow discharge depth is determined.

In the above-described third embodiment of the invention and the modification thereof, it is preferable to determine the discharge depth so that a discharge depth which in larger than about 30% to about 50% of the rated capacity is determined an deep and that a discharge depth which is smaller than about 30% to about 50% of the rated capacity is detained as shallow, in order to minimize the decrease in the lifetime of the secondary battery.

Instead of the above-described discharge depth dichotomy of either "deep" or "shallow" as determined with respect to a predetermined reference value, it is more preferable to continuously vary the charge control voltage Vc relative to the discharge depth parameter Tt or Vs. Furthermore, as is practiced in conventional constant-voltage charge control methods, it is desirable to prescribe the control voltage values so as to maintain negative characteristics with respect to the ambient temperature.

Figure 17:
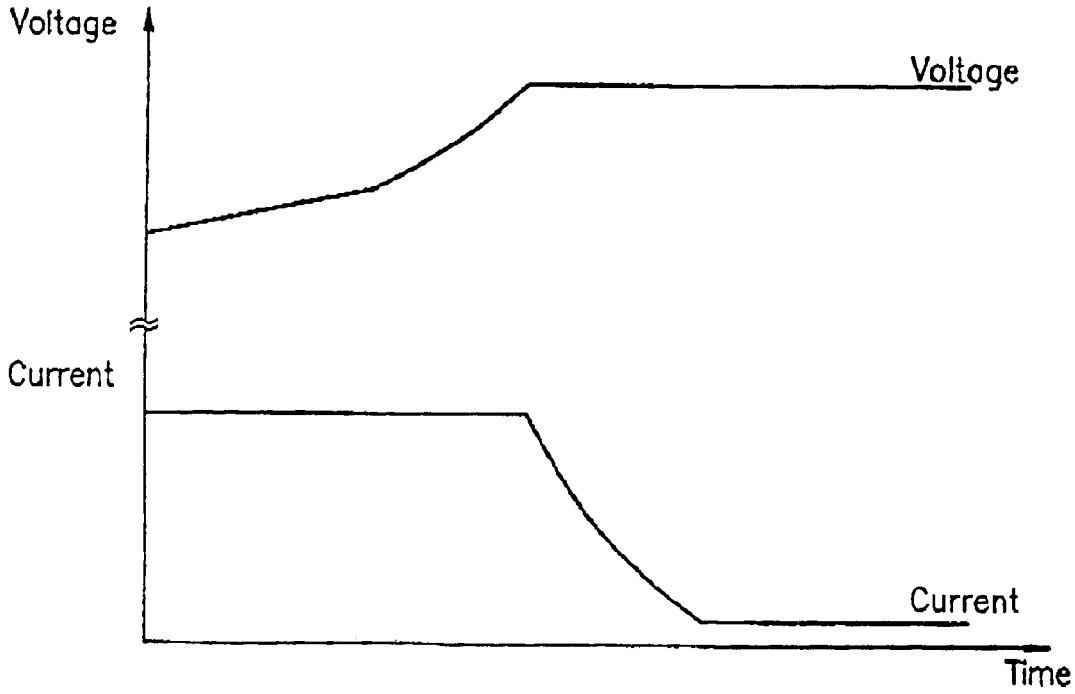
FIG. 17 is a graph illustrating the charge characteristics of a conventional constant-voltage charge method.
Figure 18:
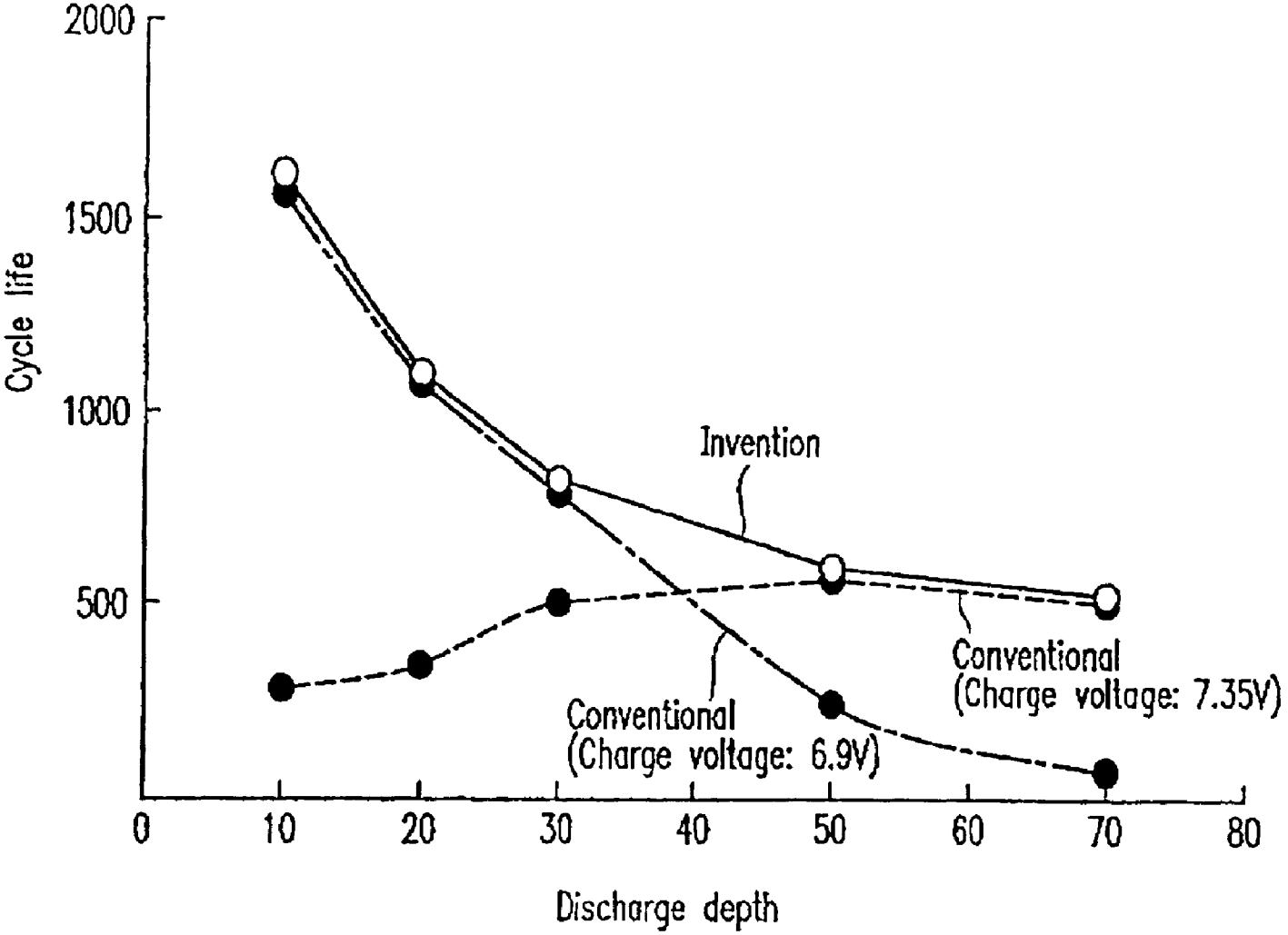
FIG. 18 is a graph illustrating the respective cycle life characteristics of a secondary battery obtained by using the charge method according to the third embodiment of the present invention and a charge method according to a conventional example.

FIG. 18 is a graph illustrating the results of respective cycle life tests for a sealed-type lead secondary battery (6 V/10 Ah) performed by using the charge method according to the third embodiment of the present invention and a conventional constant-voltage charge method illustrated in FIG. 17. In the tests, the discharge depth was varied so as to be 10%, 20%, 30%, 40%, 50%, or 70% of the rated capacity. The charge control voltage value Vc and the discharge depth reference value Vr were prescribed so that the charge control voltage value was controlled to be 6.9 V at a discharge depth of about 40% or less and to be 7.35 V at a discharge depth of more than about 40%.

The conventional constant-voltage charge method was performed with a charge control voltage of 6.9 V or 7.35 V. In all of the charge methods performed in the tests, the charge current was 4 A, the charge time was 8 hours, and the charging was performed at an ambient temperature at 25° C. The results of these cycle life tests are shown in FIG. 18.

As seen from the results shown in FIG. 18, the decrease in the cycle life associated with variation in the discharge depth is minimized by the charge method in accordance with the third embodiment of the invention as compared to the conventional constant-voltage charge method. The charge method according to the third embodiment of the invention always maintained a charge electricity amount equal to about 105% to 110% of the discharged electricity amount.

An additional cycle life test was conducted at an ambient temperature of 40° C., whereby it was confirmed that it is appropriate to impart the charge control voltage with negative characteristics at a rate of −0.0025 to 0.0035 V/cell · °C. per increase of 1° C.

As described above, in accordance with the charge method of the third embodiment of the invention, appropriate charging control can always be made with a proper voltage regardless of variation in the discharge depth of the secondary battery. As a result, the problems of undercharging and overcharging associated with the conventional constant-voltage charge methods are alleviated so as to minimize the decrease in the cycle life of secondary batteries, thereby making a substantial contribution in the industry.

Fourth Embodiment of the Invention

Hereinafter, a method for charging a secondary battery according to a fourth embodiment of the present invention will be described with reference to the accompanying figures.

Figure 19:
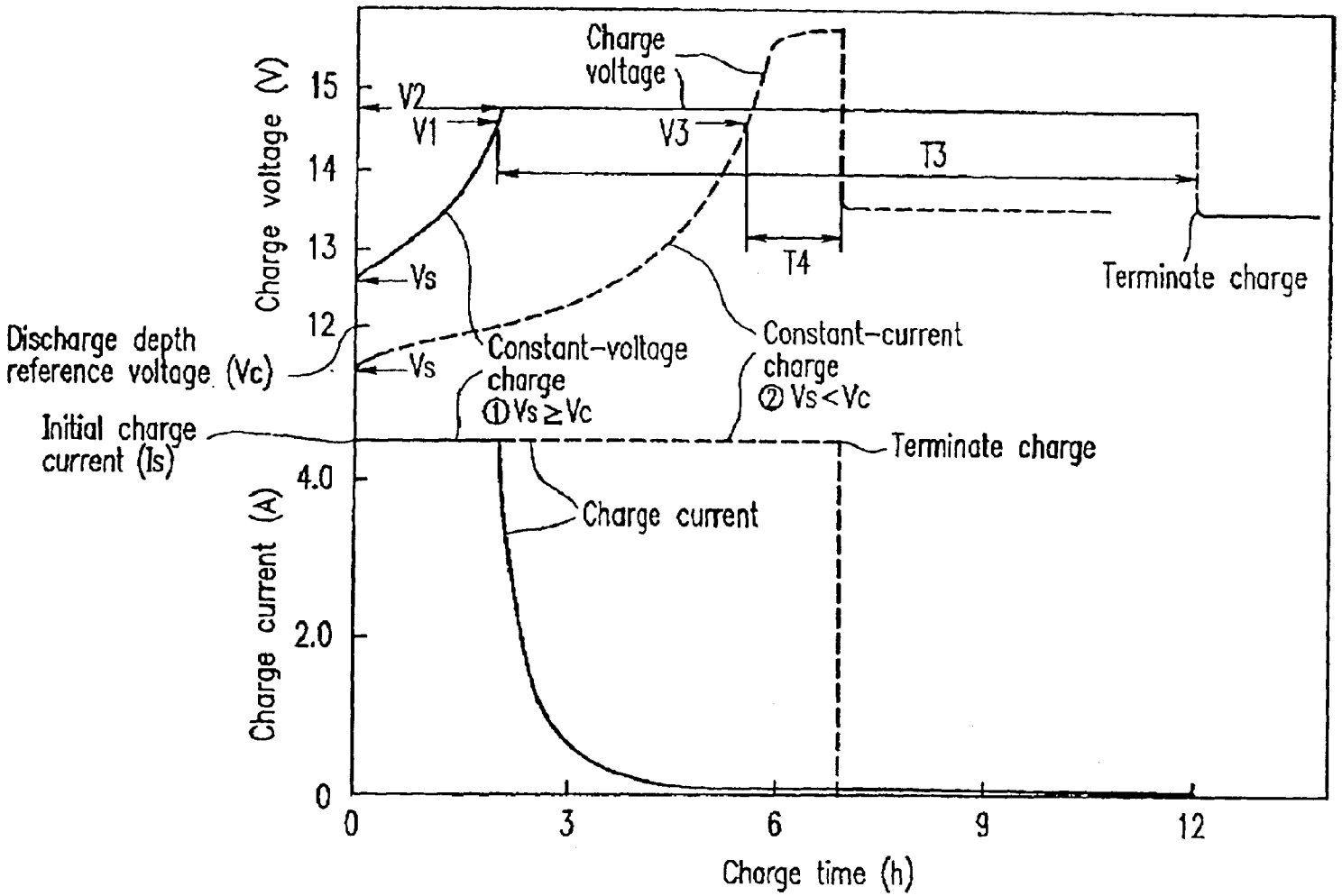
FIG. 19 is a graph illustrating the charge characteristics according to a fourth embodiment of the present invention.

FIG. 19, is a graph illustrating the charge characteristics according to the fourth embodiment of the present invention. First, a lead secondary battery is charged with an initial charge current Is(A). A charge voltage (Vs) at the beginning of charging is measured. The Vs value is compared against a discharge depth reference Voltage Vc (S1303). The charging is controlled depending on the relationship between the values of Vs and Vc as follows:

① If Vs≧Vc (as indicated by the solid line in FIG. 19), a shallow discharge state is determined, and a constant-voltage charging is performed (with a control voltage V2; indicated by the solid line in FIG. 19). It is preferable to employ a timer so that the charge is terminated after the lapse of a predetermined period of time (T3) from the point at which the charge voltage reaches a predetermined value (V1), for example, in order to secure a proper charge electricity amount. It is preferable that the respective control voltages satisfy V1<V2 to ensure a secure detection despite any fluctuation in the detected voltage, although it is also applicable to use V1=V2.

② If Vs<Vc (as indicated by the broken line in FIG. 19), a deep discharge state is determined, and a constant-current charging is performed (indicated by the broken line in FIG. 19). It is preferable to employ a timer so that the charge is terminated after the lapse of a predetermined period of time (T4) from the point at which the charge voltage reaches the predetermined value (V3) in order to prevent overcharging and secure a proper charge electricity amount.

Although the comparison results are divided into ① Vs≧Vc and ② Vs<Vc in the above example, it is also applicable to employ ① Vs>Vc and ② Vs≦Vc depending on the needs of the specific control method.

Fourth Embodiment of the Invention—Modification

Figure 20:
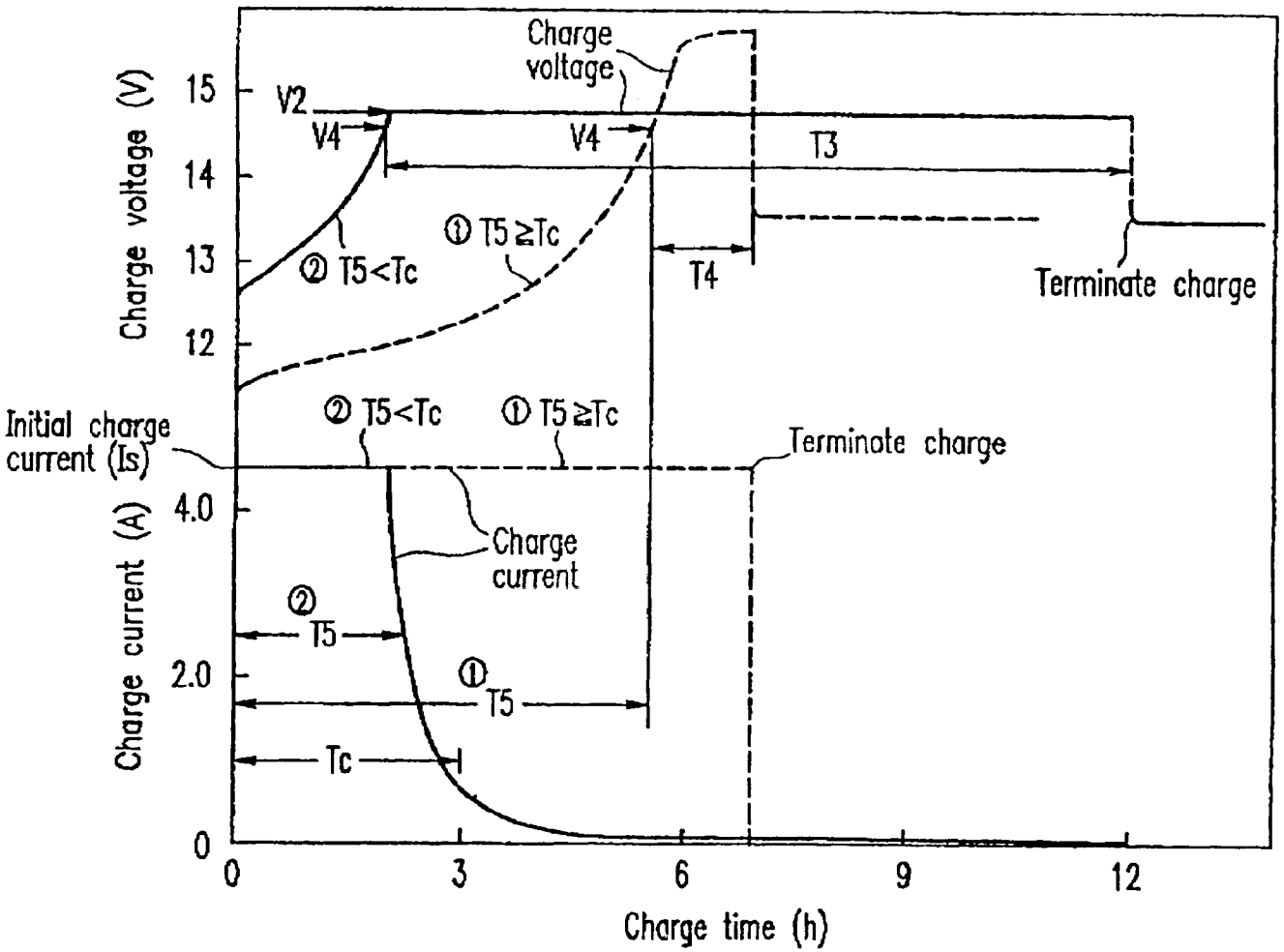
FIG. 20 is a graph illustrating the charge characteristics according to one modification of a fourth embodiment of the present invention.

FIG. 20 is a graph illustrating one modification of the charge pattern according to the fourth embodiment of the present invention, where a different method for determining the discharge depth is employed. Specifically, a constant-current charging is performed with an initial charge current (Is), and the time (T5) which elapses from the beginning of charging until the charge voltage reaches a predetermined voltage value (V4) is measured. The measured time T5 is compared against a discharge depth reference time (Tc).

① If T5≧Tc (indicated by the broken line in FIG. 20), a deep discharge state is determined. Thereafter, the charging is controlled in the same manner as in the case of "② Vs≧Vc" in the fourth embodiment of the invention.

① If T5<Tc (indicated by the solid line in FIG. 20), a shallow discharge state is determined Thereafter, the charging is controlled in the same manner as in the case of "① Vs≧Vc" in the fourth embodiment of the invention.

Although the comparison results are divided into ① T5≧Tc and ② T5<Tc in the above example, it is also applicable to employ ① T5>Tc and ② T5≦Tc depending on the needs of the specific control method, as in the fourth embodiment of the invention.

In the above-described fourth embodiment of the invention and the modification thereof, the charge control which is performed in the case of determining a shallow discharge state is illustrated as a single level constant-voltage control. However, the present invention is not limited thereto; for example, a two level constant-voltage control may be performed where the charge voltage is decreased upon detection of a decrease of the charge current. In the case of determining a deep discharge state, a two level constant-current charging may be performed where the charge current is decreased upon detection of an increase in the charge voltage V3, thereby further minimizing overcharging.

In a charger having the above-described charge characteristics, the control circuits for the constant-voltage charge and the constant-current charge can be constructed based on substantially the same circuitry. Therefore, such a charger can be realized by merely adding circuitry for detecting the charge voltages V1 and V2 at the beginning of the charging and circuitry for selecting either constant-voltage charging or constant-current charging.

Fourth Embodiment of the Invention—Example

The inventors conducted charge/discharge cycle life tests by using the charge method according to the fourth embodiment of the invention and by using conventional constant-voltage charging and constant-current charging methods.

The following parameter values were used in the tests:

Fourth Embodiment of the Invention—Charge Method According to the Fourth Embodiment of the Invention as Illustrated in FIG. 19 initial charge current Is: 4.5 A discharge depth reference voltage Vc: 12.0 V charge control voltage V2 for a shallow discharge state: 14.7 V (A timer is started when the charge voltage equals V1=14.5 V and the charging it terminated after a lapse of T3=10 h from the start of the timer)

charge control current for a deep discharge state: 4.5 A (A timer is started when the charge voltage equals V1=14.5 V and the charging it terminated after a lapse of T4=1.5 h from the start of the timer)

Figure 22:
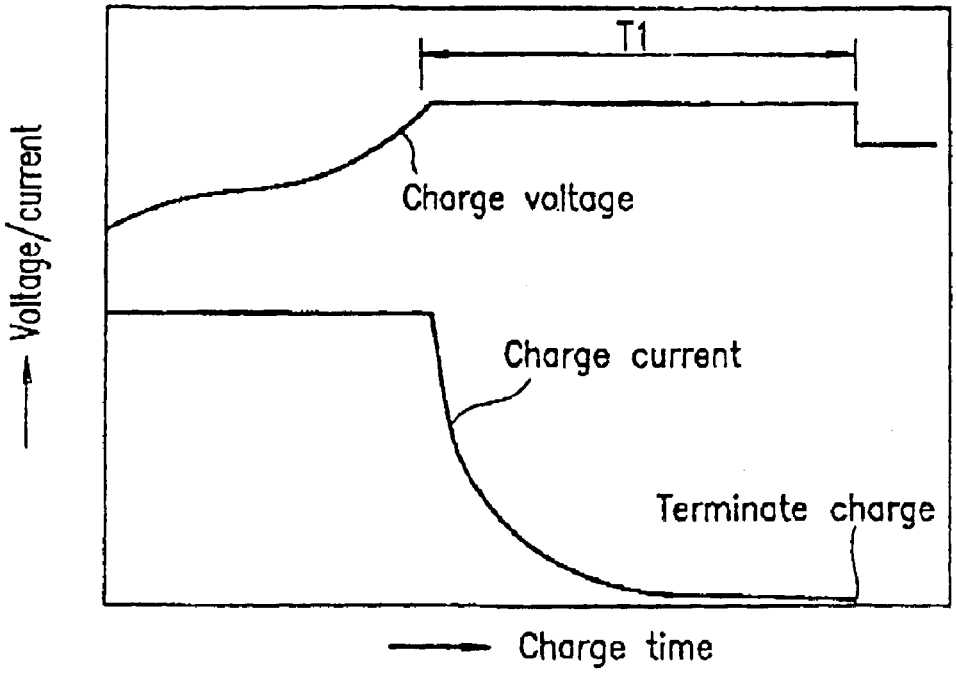
FIG. 22 is a graph illustrating the charge characteristics of a conventional constant-voltage charge method.

Conventional Example 1—Constant-voltage Charge Method as Illustrated in FIG. 22 initial charge current: 4.5 A charge control voltage: 14.7 V charge time: 12 hs

Figure 23:
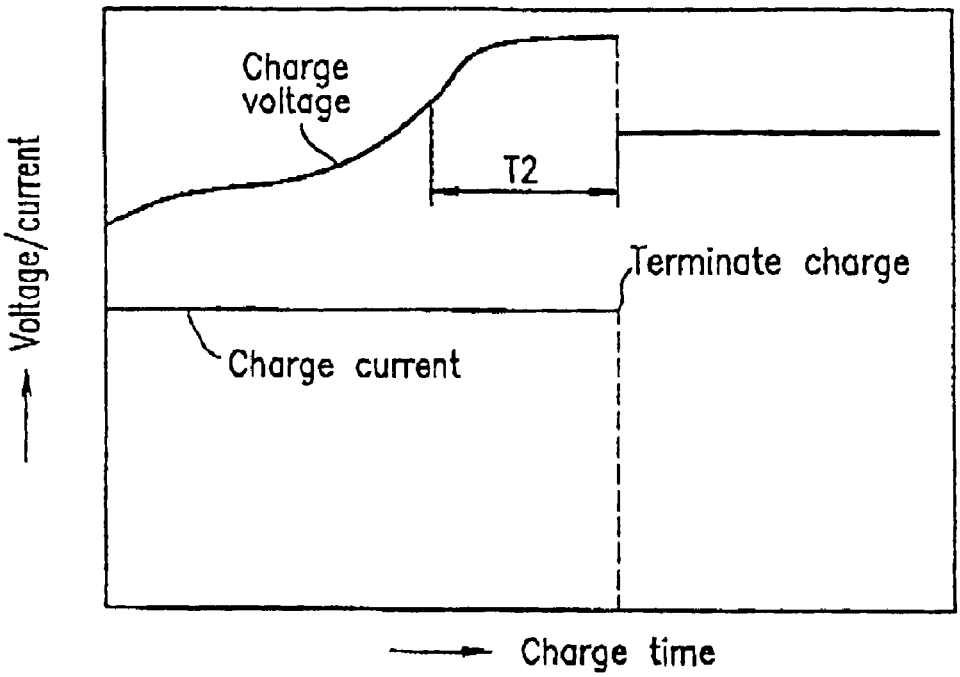
PRIOR ART FIG. 23
FIG. 23 is a graph illustrating the charge characteristics of a conventional constant-current charge method.

Conventional Example 2—Constant-current Charge Method as Illustrated in FIG. 23 initial charge current: 4.5 A (A timer is started when the charge voltage equals 14.5 V and the charging is terminated after a lapse of T4=1.5 h from the start of the timer)

By employing the charge methods according to the fourth embodiment of the invention and Conventional Examples 1 and 2, cycle life tests were conducted for sealed-type lead secondary batteries (12 V/30 Ah) by varying the discharge depth so as to be 5%, 10%, 30%, 60%, or 90% of the rated capacity. The results are shown in FIG. 21.

Figure 21:
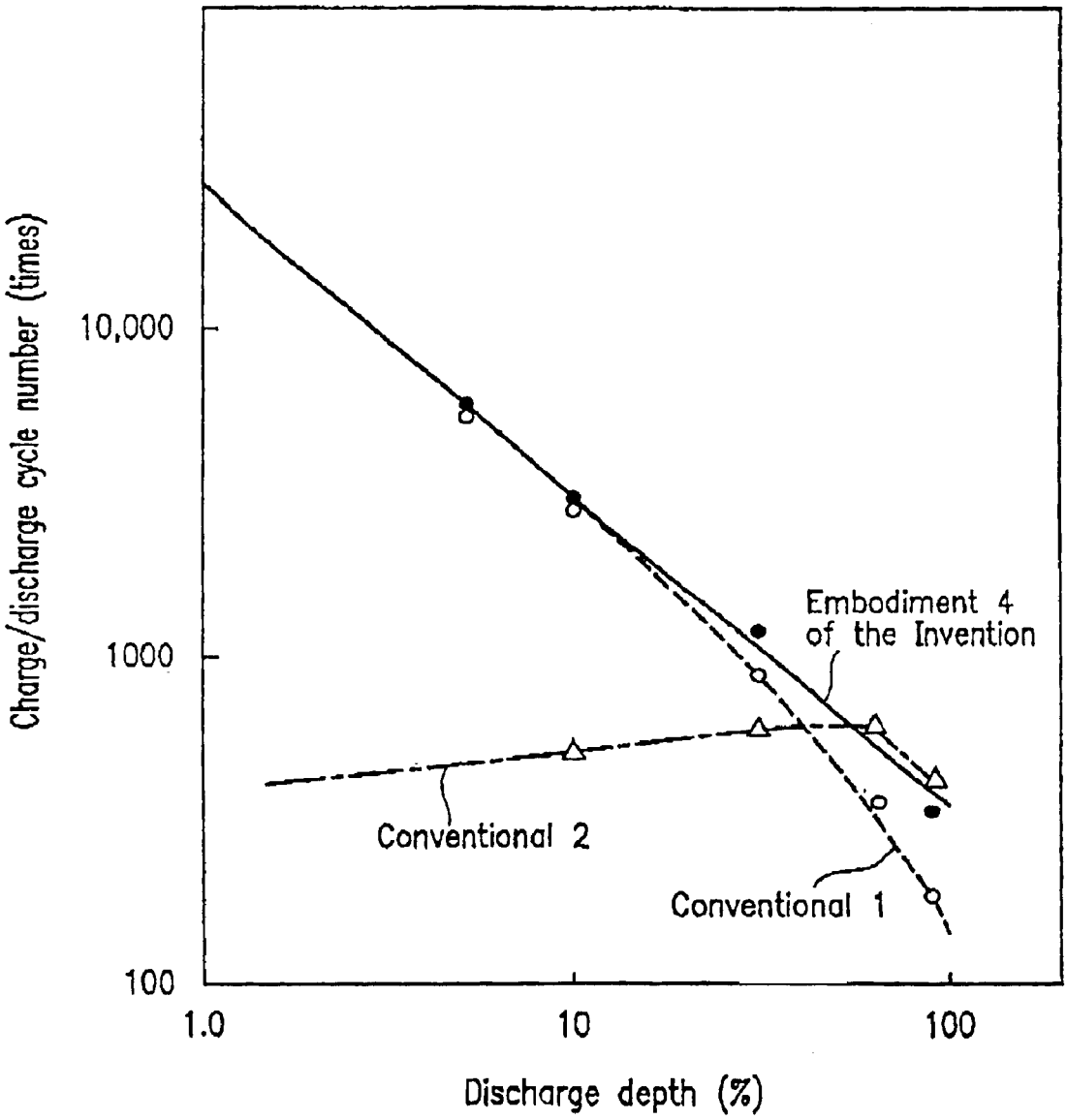
FIG. 21 to a graph illustrating the respective cycle characteristics according to the fourth embodiment of the present invention and Conventional Examples 1 and 2.

As seen from the results shown in FIG. 21, the charge electricity amount was about 105% to about 115% of the discharge electricity amount, indicative of substantial stability, regardless of the discharge depth. The cycle life of the secondary batteries in a deep discharge state was greatly improved according to the fourth embodiment of the invention as compared to that obtained by the constant-voltage charging of Conventional Example 1. The cycle life of the secondary batteries in a shallow discharge state was greatly improved according to the fourth embodiment of the invention as compared to that obtained by the constant-current charging of Conventional Example 2.

Thus, in accordance with the charge method of the fourth embodiment of the invention, either constant-voltage charging or constant-current charging can be selected depending on the discharge state, so that a constant charge electricity amount relative to the discharged electricity amount can be provided irrespective of the discharge depths. As a result, a stable cycle life can be expected regardless of a deep or shallow discharge state. As seen from the results shown in FIG. 21, about 30% to about 50% of the rated capacity can be suitably used as a reference value for determining the discharge depth. It is preferable to determine the discharge depth so that a discharge depth which is larger than about 30% to about 50% of the rated capacity is determined an deep (so that a constant-current control is performed) and that a discharge depth which is smaller than about 30% to about 50% of the rated capacity is determined as shallow (so that a constant-voltage control is performed).

Thus, in accordance with the charge method of the fourth embodiment of the invention, a proper charge electricity amount can always be provided through appropriate charging control, regardless of variation in the discharge depth of the secondary battery, without causing undercharging or overcharging. As a result, the decrease in the cycle life of secondary batteries is minimized, thereby making a substantial contribution in the industry.

Thus, in accordance with the charge method of the present invention, appropriate charging can always be performed by detecting any user-induced variation in the discharge depth of a secondary battery (in particular a lead secondary battery). As a result, the sealed-type lead secondary battery can enjoy an enhanced longevity, thereby making a substantial contribution in the industry.

Thus, according to the charge method of the present invention, the decrease in cycle life, in the region corresponding to a small discharge depth, can be minimized for lead secondary batteries employing a Pb—Ca type positive grid alloy and an electrolytic solution with a specific gravity of 1.280 or more at 20° C. The charge method of the invention is very useful especially for sealed-type lead secondary batteries, for which g Pb—Ca type positive grid alloy is indispensable.

As described above, in accordance with the charge method of the present invention, appropriate charging control can always be made with a proper voltage regardless of variation in the discharge depth of the secondary battery. As a result, the problems of undercharging and overcharging associated with the conventional constant-voltage charge methods are alleviated so as to minimize the decrease in the cycle life of secondary batteries, thereby making a substantial contribution in the industry.

Thus, in accordance with the charge method of the present invention, a proper charge electricity amount can always be provided through appropriate charging control, regardless of variation in the discharge depth of the secondary battery, without causing undercharging or overcharging. As a result, the decrease in the cycle life of secondary batteries is minimized, thereby making a substantial contribution in the industry.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

[1. A method for charging a secondary battery, comprising:

a step of precharging the secondary battery;

a step of measuring a secondary battery voltage Vba1 after performing the precharging; and a step of charging the secondary battery based on the measurement of the secondary battery voltage Vba1.]

[2. A method according to claim 1, wherein the precharging step comprises a step of measuring a secondary battery voltage Vba0 prior to the charging of the secondary battery, and wherein the charging step comprises:

a step of comparing the secondary battery voltage Vba1 against a first prescribed voltage V1, a second prescribed voltage V2, and a third prescribed voltage V3, where V3<V2<V1;

a step of performing a charging in a first charge mode if the secondary battery voltage Vba1 satisfies the relationship V2<=Vba1<=V1;

a step of performing a charging in a second charge mode if the secondary battery voltage Vba1 satisfies the relationship V3<=Vba1<=V2; and an step of performing an active charging if the secondary battery voltage Vba1 is lower than the third prescribed voltage V3.]

[3. A method according to claim 2, wherein the active charging step comprises:

a step of repeating a cycle comprising the active charging and an ensuing measurement of a secondary battery voltage Vba2, within a predetermined cycle limit, until the secondary battery voltage Vba2 becomes higher than the third prescribed voltage V3, and performing a charging in the second charge mode if the secondary battery voltage Vba2 becomes higher than the third prescribed voltage V3 within the predetermined cycle limit; and a step of terminating the charging for the secondary battery if the secondary battery voltage Vba2 has not become higher than the third prescribed voltage V3 within the predetermined cycle limit.]

[4. A method according to claim 2, wherein the first charging in a first charge mode step comprises:

a step of subjecting the secondary battery to a constant-voltage charge using a first charge voltage Vch1; and a step of subjecting the secondary battery to a constant-voltage charge using a second charge voltage Vch2 after a charge current has decreased to a predetermined value Ia, where Vch2<Vch1, and wherein the second charging in a second charge mode step comprises:

a step of subjecting the secondary battery to a constant-voltage charge using a third charge voltage Vch3;

an step of subjecting the secondary battery to a constant-current charge using a predetermined charge current Ic after the charge current has decreased to a predetermined value Ib, and a step of subjecting the secondary battery to a constant-voltage charge using a charge voltage Vch4 after the constant-current charge step, where Vch4<Vch3.]

[5. A method according to claim 4, wherein the precharging step comprises a step of measuring an ambient temperature Ta prior to the charging of the secondary battery; and wherein the first charge voltage Vch1, the second charge voltage Vch2, the third charge voltage Vch3, and the fourth charge voltage Vch4 have negative characteristics with respect to the ambient temperature Ta.]

[6. A method according to claim 2, further comprising:

a step of terminating the charging for the secondary battery if the secondary battery voltage Vba1 measured after performing the precharging is higher than the first prescribed voltage v1 or if the secondary battery voltage Vba1 is lower than a fourth prescribed voltage V4, where V4<V3.]

[7. A method according to claim 2, wherein the precharging step comprises:

a step performed in a case where the secondary battery voltage Vba0 is equal to or greater than a fifth prescribed voltage V5, comprising:

measuring the secondary battery voltage Vba1 after the precharging if a charge current Ip during the precharging is equal to or smaller than Imax and equal to or greater than Imin (where Imin>0 and Imin<Imax);

displaying a warning message to indicate abnormal operating of a charging device and terminating the charging if the charge current Ip is greater than Imax; or displaying a warning message to indicate abnormality of the secondary battery and terminating the charging if the charge current Ip during the precharging is smaller than Imin; and a step performed in a case where the secondary battery voltage Vba0 is lower than the fifth prescribed voltage V5, comprising:

displaying a warning message to indicate abnormal operation of the charging device and terminating the charging if the charge current Ip is greater than Imax; and measuring the secondary battery voltage Vba1 after the precharging if the charge current Ip during the precharging is equal to or smaller than Imax.]

*8. A method for charging a secondary battery, comprising:*

*a step of precharging the secondary battery;*

*a step of measuring a secondary battery voltage Vba1 after performing the precharging;*

*a step of terminating a charging for the secondary battery if the secondary battery voltage Vba1 is lower than a minimum prescribed voltage; and*

*a step of charging the secondary battery if the secondary battery voltage Vba1 is at least equal to the minimum prescribed voltage,*

*wherein charging the secondary battery comprises one of a first charging in a first charge mode, a second charging in a second charge mode, and an active charging.*

* * * * *